(12) United States Patent
Ito et al.

(10) Patent No.: US 12,460,084 B2
(45) Date of Patent: *Nov. 4, 2025

(54) DISPERSION LIQUID, COMPOSITION, SEALING MEMBER, LIGHT-EMITTING DEVICE, ILLUMINATION TOOL, DISPLAY DEVICE, AND METHOD FOR PRODUCING DISPERSION LIQUID

(71) Applicant: SUMITOMO OSAKA CEMENT CO., LTD., Tokyo (JP)

(72) Inventors: Tomomi Ito, Tokyo (JP); Kenji Harada, Tokyo (JP); Takeshi Otsuka, Tokyo (JP)

(73) Assignee: SUMITOMO OSAKA CEMENT CO., LTD., Tokyo (JP)

(*) Notice: Subject to any disclaimer, the term of this patent is extended or adjusted under 35 U.S.C. 154(b) by 1073 days.

This patent is subject to a terminal disclaimer.

(21) Appl. No.: 17/599,461

(22) PCT Filed: Mar. 24, 2020

(86) PCT No.: PCT/JP2020/012985
§ 371 (c)(1),
(2) Date: Sep. 28, 2021

(87) PCT Pub. No.: WO2020/203462
PCT Pub. Date: Oct. 8, 2020

(65) Prior Publication Data
US 2022/0177709 A1    Jun. 9, 2022

(30) Foreign Application Priority Data

Mar. 29, 2019  (JP) ................... 2019-066737

(51) Int. Cl.
*C09C 3/12*    (2006.01)
*C01G 25/02*   (2006.01)
(Continued)

(52) U.S. Cl.
CPC ............... *C09C 3/12* (2013.01); *C01G 25/02* (2013.01); *C09C 3/10* (2013.01); *C09D 7/62* (2018.01);
(Continued)

(58) Field of Classification Search
None
See application file for complete search history.

(56) References Cited

U.S. PATENT DOCUMENTS

2012/0202923 A1  8/2012  Iriguchi et al.
2017/0226418 A1  8/2017  Otsuka et al.
(Continued)

FOREIGN PATENT DOCUMENTS

| EP | 4129921 A1 | 2/2023 |
| EP | 4223697 A1 | 8/2023 |

(Continued)

OTHER PUBLICATIONS

Machine translation of JP 2015096950 A, originally published May 2015 to Otsuka et al. (Year: 2015).*

(Continued)

*Primary Examiner* — Colin W. Slifka
(74) *Attorney, Agent, or Firm* — Merchant & Gould P.C.

(57) ABSTRACT

A dispersion liquid according to the present invention is a dispersion liquid containing metal oxide particles which have been surface-modified with a silane compound and a silicone compound, in which, when the dispersion liquid is dried by vacuum drying to separate the metal oxide particles, and a transmission spectrum of the separated metal oxide particles is measured in a wavenumber range from 800 $cm^{-1}$ to 3800 $cm^{-1}$ with a Fourier transform infrared spectrophotometer, Formula (1) below: IA/IB≤3.5 is satisfied (in the formula, "IA" represents a spectrum value at 3500 $cm^{-1}$ and "IB" represents a spectrum value at 1100 $cm^{-1}$).

13 Claims, 2 Drawing Sheets

(51) Int. Cl.
  *C09C 3/10* (2006.01)
  *C09D 7/40* (2018.01)
  *C09D 7/62* (2018.01)
  *C09D 183/04* (2006.01)
  *H10H 20/854* (2025.01)

(52) U.S. Cl.
  CPC ............ *C09D 7/67* (2018.01); *C09D 183/04* (2013.01); *H10H 20/854* (2025.01); *C01P 2002/82* (2013.01); *C01P 2004/51* (2013.01); *C01P 2004/64* (2013.01); *C01P 2006/60* (2013.01)

(56) References Cited

U.S. PATENT DOCUMENTS

| | | | |
|---|---|---|---|
| 2018/0062049 A1* | 3/2018 | Otsuka | C08G 59/4246 |
| 2018/0323124 A1 | 11/2018 | Yamaguchi et al. | |
| 2022/0177709 A1 | 6/2022 | Ito et al. | |
| 2023/0102420 A1 | 3/2023 | Ito et al. | |

FOREIGN PATENT DOCUMENTS

| | | |
|---|---|---|
| EP | 4223698 A1 | 8/2023 |
| EP | 4223699 A1 | 8/2023 |
| JP | H09208508 | 8/1997 |
| JP | 2010-4035 A | 1/2010 |
| JP | 2016-175804 A | 10/2016 |
| JP | 2016-222850 A | 12/2016 |
| JP | 2017-193631 A | 10/2017 |
| JP | 2018107472 | 7/2018 |
| JP | 2020002305 | 1/2020 |
| JP | 2020055737 | 4/2020 |
| WO | 2011049121 | 4/2011 |
| WO | 2016/142992 A1 | 9/2016 |
| WO | 2016208640 | 12/2016 |
| WO | 2020067417 | 4/2020 |
| WO | 2020203462 | 10/2020 |
| WO | 2021193727 | 9/2021 |

OTHER PUBLICATIONS

Office Action for Japanese Patent Application No. 2021-511498 (Oct. 10, 2023).
Dijkstra Tessa W. et al: "Silsesquioxane Models for Geminal Silica Surface Silanol Sites. A Spectroscopic Investigation of Different Types of Silanols", Journal of the American Chemical Society, vol. 124, No. 33: 9856-9864 (2002).
Gao Yanfeng et al: "Investigation on Permeation Properties of Liquids into HTV Silicone Rubber Materials", IEEE Transactions on Dielectrics and Electrical Insulation, IEEE Service Center, Piscataway, NJ, US, vol. 21, No. 6: 2428-2437 (2014).
Database WPI Week 201776, Thomson Scientific, London, GB; AN 2017-72759V, XP002809986, -& JP 2017 193631 A (Sumitomo Osaka Cement Co Ltd) (Oct. 26, 2017).
Database WPI Week 201914, Thomson Scientific, London, GB; AN 2019-139114, XP002809987, -& WO 2019/026962 A1 (Sumitomo Osaka Cement Co Ltd) (Feb. 7, 2019).
Database WPI Week 201670, Thomson Scientific, London, GB; AN 2016-62437U, XP002809988, -& JP 2016 175804 A (Sumitomo Osaka Cement Co Ltd) (Oct. 6, 2016).
Search Report European Patent Application No. 20785402.7(Aug. 30, 2023).
International Search Report for PCT/JP2020/012985 (mailed Jun. 16, 2020).
"International Search Report (Form PCT/ISA/210) of PCT/JP2021/012271", mailed on May 18, 2021, with English translation thereof, 5 pages.
"International Search Report (Form PCT/ISA/210) of PCT/JP2021/035834," with English translation thereof, mailed on Dec. 7, 2021, pp. 1-5.
"International Search Report (Form PCT/ISA/210) of PCT/JP2021/035829", mailed on Dec. 7, 2021, With English translation thereof, pp. 1-4.
Office Action issued for U.S. Appl. No. 17/910,829 on May 12, 2025, 7 pages.
Office Action issued for U.S. Appl. No. 18/029,098 on May 13, 2025, 9 pages.
Office Action issued for U.S. Appl. No. 18/029,101 on May 13, 2025, 9 pages.

* cited by examiner

DISPERSION LIQUID, COMPOSITION, SEALING MEMBER, LIGHT-EMITTING DEVICE, ILLUMINATION TOOL, DISPLAY DEVICE, AND METHOD FOR PRODUCING DISPERSION LIQUID

TECHNICAL FIELD

The present invention relates to a dispersion liquid containing metal oxide particles which have been surface-modified with a silane compound and a silicone compound, a composition, a sealing member, a light-emitting device, an illumination tool, a display device, and a method for producing a dispersion liquid.

The present application is a U.S. National Stage Application under 35 U.S.C. § 371 of International Patent Application No. PCT/JP2020/012985, filed on Mar. 24, 2020, which claims benefit of priority to Japanese Patent Application No. 2019-066737, filed in Japan on Mar. 29, 2019, the disclosures of all of which are hereby incorporated by reference in their entireties.

BACKGROUND

As a light source having advantages such as a small size, a long service life, and low-voltage driving, light-emitting diodes (LED) are being broadly used. An LED chip in an LED package is generally sealed with a sealing material containing a resin in order to prevent the contact with a deterioration factor present in the external environment such as oxygen or moisture. Therefore, light emitted from the LED chip passes through the sealing material and is released outwards. Therefore, it becomes important to efficiently extract the light emitted from the LED chip to the outside of the LED package in order to increase the luminous flux emitted from the LED package.

As a sealing material for improving the extraction efficiency of light emitted from the LED chip, there has been a proposal of a composition for forming a light scattering complex containing metal oxide particles which have been surface-modified with a surface-modifying material having one or more functional groups selected from an alkenyl group, a H—Si group, and an alkoxy group and a matrix resin composition (Patent Literature 1).

In this composition for forming a light scattering complex, a dispersion liquid containing metal oxide particles having small dispersed-particle diameters and a high refractive index is mixed with a silicone resin in a state where transparency is relatively maintained. Therefore, in a light scattering complex obtained by curing the composition for forming a light scattering complex, deterioration of the light-transmitting property is suppressed, and the light-scattering property improves.

CITATION LIST

Patent Literature

[Patent Literature No. 1] Pamphlet of International Publication No. WO 2016/142992

SUMMARY OF INVENTION

Technical Problem

Incidentally, the present inventors found that, when metal oxide particles having a high refractive index are contained in a sealing material, not only is the light-scattering property of a sealing member to be obtained improved, but the refractive index of the sealing member is also improved. When the refractive index of the sealing member improves, the extraction efficiency of light from a generally-sealed light-emitting element improves. In the case of containing metal oxide particles in a sealing material for such a purpose, the content of the metal oxide particles is advantageously as large as possible from the viewpoint of improvement in the refractive index.

Incidentally, in recent years, due to the extended service lives of LEDs, there has been an increasing demand for a highly heat-resistant methyl-based silicone resin as a sealing resin that is used in sealing materials. Methyl-based silicone resins have a large content of a methyl group and a high degree of hydrophobicity compared with phenyl silicone resins and the like that have been generally used in the related art. Therefore, there has been a problem in that, when even metal oxide particles have a hydrophobilized surface as in Patent Literature 1 are mixed with the methyl-based silicone resin, the metal oxide particles agglomerate with each other and a transparent composition cannot be obtained. Such a problem becomes more significant as the content of the metal oxide particles in a sealing material increases.

The present invention has been made in order to solve the above-described problem, and an object of the present invention is to provide a dispersion liquid in which metal oxide particles are contained and agglomeration of the metal oxide particles is suppressed when dispersed in a methyl-based silicone resin, a composition containing the same, a sealing member that is formed using the composition, a light-emitting device having this sealing member, an illumination tool and a display device each including this light-emitting device, and a method for producing a dispersion liquid.

Solution to Problem

In order to solve the above-described problem, a first aspect of the present invention provides a dispersion liquid containing metal oxide particles which have been surface-modified with a silane compound and a silicone compound, in which, when the dispersion liquid is dried by vacuum drying to separate the metal oxide particles, a transmission spectrum of the separated metal oxide particles is measured in a wavenumber range from 800 $cm^{-1}$ to 3800 $cm^{-1}$ with a Fourier transform infrared spectrophotometer, and spectrum values measured in the range are standardized such that a maximum value of the spectrum values is set to 100 and a minimum value of the spectrum values is set to 0, Formula (1) below is satisfied:

$$IA/IB \leq 3.5 \qquad (1)$$

(In the formula, "IA" represents a spectrum value at 3500 $cm^{-1}$ and "IB" represents a spectrum value at 1100 $cm^{-1}$).

In addition, in order to solve the above-described problem, a second aspect of the present invention provides a composition that is obtained by mixing the dispersion liquid and a resin component.

Furthermore, in order to solve the above-described problem, a third aspect of the present invention provides a sealing member that is a cured substance of the composition.

In addition, in order to solve the above-described problem, a fourth aspect of the present invention provides a light-emitting device including the sealing member and a light-emitting element sealed by the sealing member.

Furthermore, in order to solve the above-described problem, a fifth aspect of the present invention provides an illumination tool or a display device including the light-emitting device.

In addition, in order to solve the above-described problem, a sixth aspect of the present invention provides a method for producing a dispersion liquid having a first step of mixing at least a silane compound and water to obtain a hydrolysis liquid in which the silane compound is hydrolyzed, a second step of mixing the hydrolysis liquid and metal oxide particles to obtain a liquid mixture, a third step of dispersing the metal oxide particles in the liquid mixture to obtain a first dispersion liquid, and a fourth step of treating the metal oxide particles in the first dispersion liquid with a silicone compound to obtain a second dispersion liquid, in which a content of the metal oxide particles in the liquid mixture is 10% by mass or more and 49% by mass or less, and a total content of the silane compound and the metal oxide particles in the liquid mixture is 65% by mass or more and 98% by mass or less.

In the first step, a catalyst may be mixed together with the silane compound and the water.

Advantageous Effects of Invention

As described above, according to the present invention, it is possible to provide a dispersion liquid in which metal oxide particles are contained and agglomeration of the metal oxide particles is suppressed when dispersed in a methyl-based silicone resin, a composition containing the same, a sealing member that is formed using the composition, a light-emitting device having this sealing member, an illumination tool and a display device each including this light-emitting device, and a method for producing a dispersion liquid.

DESCRIPTION OF EMBODIMENTS

Figure 1:
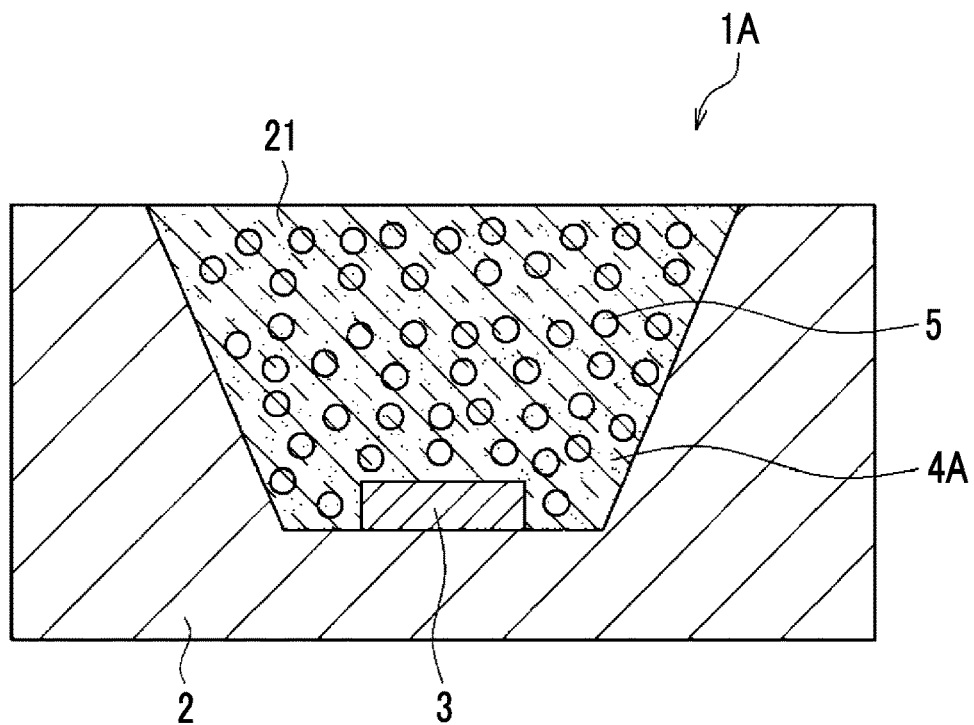
FIG. 1 is a schematic cross-sectional view showing a preferable example of a light-emitting device according to an embodiment of the present invention.

Hereinafter, examples of a preferable embodiment of the present invention will be described in detail with reference to the accompanying drawings.

The present embodiment is simply a specific description for better understanding of the gist of the invention and does not limit the present invention unless particularly otherwise specified. Amounts, numbers, kinds, ratios, configurations, and the like can be omitted, added, substituted, or changed without departing from the gist of the present invention.

<1. Present Inventors' Idea>

First, prior to the detailed description of the present invention, an idea by the present inventors that leads to the present invention will be described.

Generally, in the production of a sealing material (composition) that is to serve as a raw material of sealing members, metal oxide particles are modified by a surface-modifying material and dispersed in a resin such as a silicone resin. However, methyl-based silicone resins have a large content of a methyl group and a high degree of hydrophobicity compared with phenyl silicone resins and the like that have been generally used in the related art. Therefore, even when the metal oxide particles are modified with a surface-modifying material as described above, it has been difficult to uniformly disperse the metal oxide particles in methyl-based silicone resins.

Therefore, as a result of intensive studies to solve the problem, the present inventors found that a simple increase in the amount of the surface-modifying material does not significantly improve the dispersibility of metal oxide particles in methyl-based silicone resins.

The present inventors accepted this result, carried out additional studies, and paid attention to the modification state of surface-modifying materials on the surfaces of metal oxide particles. That is, even when metal oxide particles are modified using a large amount of a surface-modifying material, in a case where only a small amount of the surface-modifying material is attached to the surfaces of the metal oxide particles, the surfaces of the metal oxide particle are not sufficiently hydrophobilized. On the other hand, even when metal oxide particles are modified using a small amount of a surface-modifying material, in a case where the proportion of the surface-modifying material attached to the surfaces of the metal oxide particles is high, and a large amount of the surface-modifying material is attached to the surfaces of the metal oxide particles, the surfaces of the metal oxide particles are sufficiently hydrophobilized.

In addition, the present inventors found a fact that, in the case of using a silane compound and a silicone compound as surface-modifying materials, the degree of attachment of the surface-modifying materials to metal oxide particles as described above can be measured and observed by a Fourier transform infrared spectrophotometer (FT-IR) and another fact that a silane compound and a silicone compound can be sufficiently adhered to the surfaces of the metal oxide particles by a method described below and completed the present invention.

<2. Dispersion Liquid>

Next, a dispersion liquid according to the present embodiment will be described. The dispersion liquid according to the present embodiment contains metal oxide particles which have been surface-modified with a silane compound and a silicone compound.

In the present embodiment, when the dispersion liquid is dried by vacuum drying to separate the metal oxide particles, a transmission spectrum of the separated metal oxide particles is measured in a wavenumber range from 800 cm$^{-1}$ to 3800 cm$^{-1}$ with a Fourier transform infrared spectrophotometer, and furthermore, spectrum values measured in the range are standardized such that the maximum value of the spectrum values is set to 100 and the minimum value of the spectrum values is set to 0, Formula (1) below is satisfied.

$$IA/IB \leq 3.5 \qquad (1)$$

(In the formula, "IA" represents a spectrum value at 3500 cm$^{-1}$ and "IB" represents a spectrum value at 1100 cm$^{-1}$).

When the above-described condition is satisfied, agglomeration of the metal oxide particles is suppressed at the time of mixing the dispersion liquid according to the present embodiment with a methyl-based silicone resin and dispersing the metal oxide particles in the methyl-based silicone resin.

As a result, a composition (resin composition) that is obtained as a mixture is less likely to become turbid and becomes relatively transparent.

In more detail, in a transmission spectrum that is measured with a Fourier transform infrared spectrophotometer, the position at a wavenumber of 1100 cm$^{-1}$ belongs to a siloxane bond (Si—O—Si bond), and the position at a wavenumber of 3500 cm$^{-1}$ belongs to a silanol group (Si—OH group). The silane compound and the silicone compound each have a Si—OH group capable of forming a Si—O—Si bond and a group capable of forming a Si—OH group. Therefore, comparison of a spectrum value (IA) at 3500 cm$^{-1}$ and a spectrum value (IB) at 1100 cm$^{-1}$ makes it possible to observe the reaction degree of Si—OH or the group capable of forming a Si—OH group in the silane compound and the silicone compound.

In addition, the present inventors found that, in a case where the IA/IB is 3.5 or less, the silane compound and the silicone compound are sufficiently attached to the surfaces of the metal oxide particles. In such a case, the metal oxide particles do not agglomerate and can be dispersed in the methyl-based silicone resin even when mixed with the methyl-based silicone resin. As a result, a composition that is obtained as a mixture is less likely to become turbid and becomes relatively transparent. Furthermore, since the metal oxide particles are contained, in the case of obtaining a sealing member that seals light-emitting elements using the composition, the refractive index of the sealing member improves compared with those of sealing members made of a methyl-based silicone resin alone. In a case where a composition is obtained using the dispersion liquid according to the present embodiment and a light-emitting element is sealed using the composition as described above, the brightness of light-emitting devices improves due to the high refractive index and light transmittance of the sealing member.

In contrast, in a case where the IA/IB exceeds 3.5, the silane compound and the silicone compound are not sufficiently attached to the surfaces of the metal oxide particles, and consequently, it is not possible to produce metal oxide particles having excellent dispersibility in methyl-based silicone resins. As a result, when the dispersion liquid and the methyl-based silicone resin are mixed together, the metal oxide particles agglomerate, and a composition to be obtained becomes turbid. The IA/IB may be 3.5 or less as described above, but is preferably 3.0 or less and more preferably 2.5 or less. The IA/IB may be 2.4 or less or 2.3 or less.

In addition, the lower limit of the IA/IB is 0 because IA is preferably 0. However, even when a small amount of a silanol group (Si—OH group) remains, it is possible to mix the metal oxide particles with the methyl-based silicone resin. Therefore, regarding the lower limit of the IA/IB, the lower limit value may be 0, may be 0.1, may be 0.5, may be 1.0, or may be 1.5. The lower limit value may be 1.7, 1.9, or 2.0.

As a specific example, the transmission spectrum of the metal oxide particles can be measured with a Fourier transform infrared spectrophotometer (FT-IR) as described below.

The obtained dispersion liquid is dried by vacuum drying. Next, 0.01 to 0.05 g of the metal oxide particles obtained by drying are used, whereby the transmission spectrum is measured with a Fourier transform infrared spectrophotometer (for example, manufactured by JASCO Corporation, Model No.: FT/IR-670 Plus). The transmission spectrum can be measured as described above.

In addition, thus far, there has been no finding of metal oxide particles as described above that achieve the above-described IA/IB value. The present inventors have found that the above-described value can be achieved for the first time by a method to be described below.

Hereinafter, each component that is contained in the dispersion liquid will be described.

(2.1 Metal Oxide Particles)

The metal oxide particles scatter light that is emitted from light-emitting elements in a sealing member to be described below. In addition, depending on the kind, the metal oxide particles improve the refractive index of the sealing member. This makes the metal oxide particles contribute to improvement in the brightness of light in light-emitting devices.

The metal oxide particles that are contained in the dispersion liquid according to the present embodiment are not particularly limited. In the present embodiment, as the metal oxide particles, for example, at least one or more kinds of metal oxide particles selected from the group consisting of zirconium oxide particles, titanium oxide particles, zinc oxide particles, iron oxide particles, copper oxide particles, tin oxide particles, cerium oxide particles, tantalum oxide particles, niobium oxide particles, tungsten oxide particles, europium oxide particles, yttrium oxide particles, molybdenum oxide particles, indium oxide particles, antimony oxide particles, germanium oxide particles, lead oxide particles, bismuth oxide particles, and hafnium oxide particles and potassium titanate particles, barium titanate particles, strontium titanate particles, potassium niobate particles, lithium niobate particles, calcium tungstate particles, yttria-stabilized zirconia particles, alumina-stabilized zirconia particles, calcia-stabilized zirconia particles, magnesia-stabilized zirconia particles, scandia-stabilized zirconia particles, hafnia-stabilized zirconia particles, ytterbia-stabilized zirconia particles, ceria-stabilized zirconia particles, india-stabilized zirconia particles, strontium-stabilized zirconia particles, samarium oxide-stabilized zirconia particles, gadolinium oxide-stabilized zirconia particles, antimony-added tin oxide particles, and indium-added tin oxide particles are preferably used.

Among the above-described metal oxide particles, the dispersion liquid preferably contains at least one kind selected from the group consisting of zirconium oxide particles and titanium oxide particles from the viewpoint of improving transparency or compatibility (affinity) with a sealing resin (resin component).

In addition, the metal oxide particles preferably have a refractive index of 1.7 or higher from the viewpoint of improving the refractive index of the sealing member.

The metal oxide particles are more preferably zirconium oxide particles and/or titanium oxide particles and particularly preferably zirconium oxide particles.

The metal oxide particles may be dispersed as primary particles in the dispersion liquid or may be dispersed as secondary particles that are agglomerates of the primary particles. Usually, the metal oxide particles are dispersed as secondary particles.

The average dispersed-particle diameter of the metal oxide particles in the dispersion liquid is not particularly limited, but is, for example, 10 nm or more and 300 nm or less, preferably 20 nm or more and 250 nm or less, and more preferably 30 nm or more and 200 nm or less. The average dispersed-particle diameter may be 30 nm or more and 80 nm or less, 30 nm or more and 100 nm or less, 80 nm or more and 180 nm or less, or the like as necessary. When the average dispersed-particle diameter of the metal oxide particles is 10 nm or more, the brightness of light of a light-emitting device to be described below that is produced using this dispersion liquid improves. In addition, when the average dispersed-particle diameter of the metal oxide particles is 300 nm or less, it is possible to suppress a decrease in the light transmittance of the dispersion liquid or a composition to be described below and the sealing member that are produced using the dispersion liquid. As a result, the brightness of light of the light-emitting device improves.

The average dispersed-particle diameter of the metal oxide particles may be the particle diameter D50 of the metal oxide particles when the cumulative percentage of a scattering intensity distribution that is obtained by a dynamic light scattering method is 50%. This value can be measured with a dynamic light scattering-type particle size distribution meter (for example, manufactured by Horiba, Ltd., Model No.: SZ-100SP). The measurement can be carried out on a dispersion liquid having a solid content adjusted to 5% by mass as a subject using a silica cell having a 10 mm×10 mm optical path length. In the present specification, "solid content" refers to a residue when a volatile component has been removed from the dispersion liquid. For example, when the dispersion liquid, for example, 1.2 g of the dispersion liquid is put into a magnetic crucible and heated at 100° C. for one hour on a hot plate, a component that does not volatilize but remains (the metal oxide particles, the surface-modifying material, or the like) can be regarded as the solid content.

The average dispersed-particle diameter is measured and calculated based on the diameters of the metal oxide particles in a dispersed state regardless of whether the metal oxide particles are dispersed in a primary particle or secondary particle state. In addition, in the present embodiment, the average dispersed-particle diameter of the metal oxide particles may be measured as the average dispersed-particle diameter of the metal oxide particles to which the surface-modifying material has been attached. In the dispersion liquid, the metal oxide particles to which the surface-modifying material has been attached and the metal oxide particles to which the surface-modifying material is not attached can be present. Therefore, usually, the average dispersed-particle diameter of the metal oxide particles is measured as a value in a mixed state thereof.

The average primary particle diameter of the metal oxide particles to be used can be arbitrarily selected and is, for example, 3 nm or more and 200 nm or less, preferably 5 nm or more and 170 nm or less, and more preferably 10 nm or more and 100 nm or less. The average primary particle diameter of the inorganic particles may be 5 to 20 nm, may be 5 to 25 nm, or may be 50 to 120 nm or 50 to 150 nm as necessary. When the average primary particle diameter is in the above-described range, it is possible to suppress the deterioration of the transparency of the sealing member. As a result, it is possible to further improve the brightness of light of light-emitting devices.

The average primary particle diameter of the metal oxide particles can be measured by, for example, observation with a transmission electron microscope. First, a collodion film obtained by collecting the metal oxide particles from the dispersion liquid is observed with a transmission electron microscope, and a transmission electron microscopic image is obtained. Next, a predetermined number (for example, 100) of the metal oxide particles in the transmission electron microscopic image are selected. In addition, the longest straight-line segments (longest diameters) of the individual metal oxide particles are measured, and these measurement values are arithmetically averaged, thereby obtaining the average primary particle diameter.

Here, in a case where the metal oxide particles agglomerate together, the measurement subject is not the agglomerated particle diameter of this agglomerate. The longest diameters of a predetermined number of particles (primary particles) of the metal oxide particles that configure this agglomerate are measured, and the average primary particle diameter is obtained.

In addition, the content of the metal oxide particles in the dispersion liquid is not particularly limited as long as the metal oxide particles can be mixed with a resin component to be described below. The content of the metal oxide particles in the dispersion liquid can be arbitrarily selected and is, for example, 1% by mass or more and 70% by mass or less, preferably 5% by mass or more and 50% by mass or less, more preferably 7% by mass or more and 40% by mass or less, and still more preferably 10% by mass or more and 30% by mass or less. The content of the metal oxide particles in the dispersion liquid may be 20% by mass or more and 40% by mass or less or 25% by mass or more and 35% by mass or less as necessary.

With such an amount of the metal oxide particles, it is possible to suppress the viscosity of the dispersion liquid becoming excessively large. Therefore, it becomes easy to mix the metal oxide particles with the resin component to be described below. In addition, it is possible to suppress the amount of a solvent (dispersion medium) becoming excessive after the mixing of the metal oxide particles with the resin component, which makes it easy to remove the solvent. The metal oxide particles in the dispersion liquid of the present embodiment may be metal oxide particles that have been first surface-modified with a silane compound and then surface modified with a silicone compound.

To the surfaces of the metal oxide particles described above, a surface-modifying material to be described below is attached. Due to this adhesion, the metal oxide particles are stably dispersed in the dispersion liquid and dispersion liquids that are produced using the dispersion liquid.

(2.2 Surface-Modifying Material)

The dispersion liquid according to the present embodiment contains a surface-modifying material. This surface-modifying material is at least partially attached to the surfaces of the metal oxide particles in the dispersion liquid to modify the surfaces, thereby preventing the agglomeration of the metal oxide particles. Furthermore, the attachment improves the compatibility with the resin component.

Here, the surface-modifying material "being attached to" the metal oxide particles refers to the fact that the surface-modifying material comes in contact with or bonds to the metal oxide particles by an interaction or reaction therebetween. As the contact, for example, physical adsorption is exemplified. In addition, as the bond, an ionic bond, a hydrogen bond, a covalent bond, and the like are exemplified.

The dispersion liquid according to the present embodiment contains at least a silane compound and a silicone compound as the surface-modifying material. That is, in the present embodiment, the metal oxide particles are surface-modified with at least the silane compound and the silicone compound.

The silane compound is likely to be attached to the vicinities of the surfaces of the metal oxide particles. On the other hand, the silicone compound has a relatively large molecular weight and mainly contributes to improvement in the affinity to dispersion medium or the resin component to be described below. The joint use of the silane compound and the silicone compound improves the dispersion stability of the metal oxide particles in the methyl-based silicone resin.

On the other hand, in a case where the dispersion liquid does not contain any one of the silane compound and the silicone compound, the above-described excellent effect cannot be obtained. For example, in a case where the dispersion liquid does not contain the silane compound, the silicone compound is less likely to be attached to the surfaces of the metal oxide particles, and the dispersibility of the metal oxide particles in the methyl-based silicone resin becomes poor. On the other hand, in a case where the dispersion liquid does not contain the silicone compound, the affinity between the metal oxide particles and the methyl-based silicone resin does not become sufficiently large, and the dispersibility of the metal oxide particles in the methyl-based silicone resin becomes poor.

(Silane Compound)

The silane compound can be arbitrarily selected, and examples thereof include silane compounds including an alkyl group and an alkoxy group such as methyltrimethoxysilane, methyltriethoxysilane, methyltripropoxysilane, ethyltrimethoxysilane, ethyltriethoxysilane, and ethyltripropoxysilane, isobutyltrimethoxysilane, methylphenyldimethoxysilane and methylphenyldiethoxysilane, silane compounds including an alkenyl group and an alkoxy group such as vinyltrimethoxysilane, methacryloxypropyltrimethoxysilane and acryloxipropyltrimethoxysilane, silane compounds including a H—Si group and an alkoxy group such as diethoxymonomethylsilane, monoethoxydimethylsilane, diphenylmonomethoxysilane and diphenylmonoethoxysilane, silane compounds including other alkoxy groups such as phenyltrimethoxysilane, silane compounds including a H—Si group such as dimethylchlorosilane, methyldichlorosilane, diethylchlorosilane, ethyldichlorosilane, methylphenylchlorosilane, diphenylchlorosilane, phenyldichlorosilane, trimethoxysilane, dimethoxysilane, monomethoxysilane and triethoxysilane, and the like. One of these can be used singly or two or more thereof can be used in combination. Among these, the silane compounds having an alkoxy group, particularly, a methoxy group, are preferable since those compounds are easily attached to the metal oxide particles.

Among the above-described silane compounds, the surface-modifying material preferably contains a silane compound including an alkyl group and an alkoxy group from the viewpoint of a low viscosity and easy dispersion of inorganic particles in a dispersion step to be described below.

The number of alkoxy groups in such a silane compound including an alkyl group and an alkoxy group may be preferably 1 or more and 3 or less, and the number of alkoxy groups is more preferably 3. The number of alkoxy groups may be 1 or 2 as necessary. The number of carbon atoms in the alkoxy group can be arbitrarily selected, but is preferably 1 or more and 5 or less. The number of carbon atoms may be 1 or more and 3 or less or 2 or more and 4 or less.

The number of alkyl groups in the silane compound including an alkyl group and an alkoxy group is preferably 1 or more and 3 or less and more preferably 1. The number of alkyl groups may be 2 or 3 as necessary. The number of carbon atoms in the alkyl group is preferably 1 or more and 5 or less, more preferably 1 or more and 3 or less, and still more preferably 1 or more and 2 or less.

The total number of alkoxy groups and alkyl groups in the silane compound including an alkyl group and an alkoxy group is preferably 2 or more and 4 or less, and is preferably 4.

Examples of the silane compound as such a surface-modifying material include methyltrimethoxysilane, methyltriethoxysilane, methyltripropoxysilane, ethyltrimethoxysilane, ethyltriethoxysilane, and ethyltripropoxysilane, and one or more selected from the group consisting of these compounds can be preferably contained.

The content of the silane compound in the dispersion liquid can be arbitrarily selected and is not particularly limited, but is, for example, 50% by mass or more and 500% by mass or less, preferably 70% by mass or more and 400% by mass or less, and more preferably 90% by mass or more and 300% by mass or less with respect to 100% by mass of the amount of the metal oxide particles. The content of the silane compound in the dispersion liquid may be 80% by mass or more and 350% by mass or less or 150% by mass or more and 250% by mass or less as necessary. In such a case, it is possible to attach a sufficient amount of the silicone compound to the surfaces of the metal oxide particles through the silane compound and to improve the dispersion stability of the metal oxide particles and improve the dispersibility into the methyl-based silicone resin.

(Silicone Compound)

The silicone compound can be arbitrarily selected, and examples thereof include alkoxy group-containing phenyl silicone, dimethyl silicone, methyl phenyl silicone, methyl hydrogen silicone, methyl phenyl hydrogen silicone, diphenyl hydrogen silicone, alkoxy both-terminal phenyl silicone, alkoxy both-terminal methyl phenyl silicone, alkoxy group-containing methyl phenyl silicone, alkoxy group-containing dimethyl silicone, alkoxy one-terminal trimethyl one-terminal (methyl group one-terminal) dimethyl silicone, alkoxy group-containing phenyl silicone, and the like. One of these can be used singly or two or more thereof can be used in combination.

The silicone compound may be a monomer, may be an oligomer, or may be a resin (polymer). A monomer or an oligomer is preferably used since surface modification is easy.

Among the above-described silicone compounds, from the viewpoint of easiness in reaction and high hydrophobicity, the silicone compound is preferably alkoxy group-containing phenyl silicone, dimethyl silicone, methyl phenyl silicone, alkoxy both-terminal phenyl silicone, alkoxy both-terminal methyl phenyl silicone, alkoxy group-containing methylphenyl silicone, alkoxy group-containing dimethyl silicone, alkoxy one-terminal trimethyl one-terminal (methyl group one-terminal) dimethyl silicone, and alkoxy group-containing phenyl silicone. One or more selected from the group consisting of these compounds can be preferably used. The silicone compound more preferably contains one or more selected from the group consisting of methoxy group-containing phenyl silicone, dimethyl silicone, and methoxy group-containing dimethyl silicone.

The content of the silicone compound in the dispersion liquid can be arbitrarily selected and is not particularly limited. For example, the content of the silicone compound in the dispersion liquid is, for example, 50% by mass or more and 500% by mass or less, preferably 80% by mass or more and 400% by mass or less, and more preferably 100% by mass or more and 300% by mass or less with respect to 100% by mass of the amount of the metal oxide particles. The content of the silicone compound in the dispersion liquid may be 50% by mass or more and 200% by mass or less or 50% by mass or more and 150% by mass or less as necessary. In such a case, it is possible to attach a sufficient amount of the silicone compound to the surfaces of the metal oxide particles and to improve the dispersion stability of the metal oxide particles and improve the dispersibility into the methyl-based silicone resin. Furthermore, it is possible to reduce the amount of an isolated silicone compound and to suppress unintentional agglomeration of the metal oxide particles in the methyl-based silicone resin.

(Other Compounds)

In addition, the dispersion liquid may contain components other than the silane compound and the silicone compound as the surface-modifying material. Examples of such components include carbon-carbon unsaturated bond-containing fatty acids, specifically, a methacrylic acid, an acrylic acid, and the like.

(Total Content of Silane Compound and Silicone Compound)

The amount of the surface-modifying material with respect to the metal oxide particles, that is, the total content of the silane compound and the silicone compound is not particularly limited and can be arbitrarily selected. With respect to the amount of the metal oxide particles, the total content of the silane compound and the silicone compound is, for example, 100% by mass or more and 1000% by mass or less, preferably 150% by mass or more and 800% by mass or less, and more preferably 190% by mass or more and 600% by mass or less. The total content of the silane compound and the silicone compound may be 200% by mass or more and 900% by mass or less or 250% by mass or more and 850% by mass or less. When the amount of the surface-modifying material is in the above-described range, it is possible to sufficiently improve the dispersibility of the metal oxide particles while reducing the amount of the surface-modifying material to be isolated.

(2.3 Dispersion Medium)

The dispersion liquid according to the present embodiment may contain a dispersion medium that disperses the metal oxide particles. This dispersion medium is not particularly limited as long as the dispersion medium is capable of dispersing the metal oxide particles to which the surface-modifying material has been attached and can be mixed with the resin component to be described below.

Examples of such a dispersion medium include a variety of organic solvents such as hydrophobic solvents and hydrophilic solvents. These solvents may be used singly or two or more solvents may be used.

Examples of the hydrophobic solvents include aromatic solvents, saturated hydrocarbons, unsaturated hydrocarbons, and the like. These solvents may be used singly or two or more solvents may be used. Among the above-described hydrophobic solvents, the aromatic solvents, particularly, aromatic hydrocarbons are preferable. The aromatic solvents have excellent compatibility with the methyl-based silicone resin to be described below and contribute to improvement in the viscosity characteristics of a composition to be obtained due to the excellent compatibility and improvement in the qualities (transparency, shape, and the like) of a sealing member to be formed.

Such aromatic hydrocarbons can be arbitrarily selected, and examples thereof include benzene, toluene, ethylbenzene, 1-phenylpropane, isopropylbenzene, n-butylbenzene, tert-butylbenzene, sec-butylbenzene, o-, m- or p-xylene, 2-, 3- or 4-ethyltoluene, and the like. One of these aromatic hydrocarbons may be used singly or two or more thereof may be used in combination.

Among the above-described aromatic hydrocarbons, from the viewpoint of the stability of the dispersion liquid and easiness in handleability in the removal of the dispersion medium or the like during the production of a composition to be described below, one or more selected from the group consisting of toluene, o-, m- or p-xylene, and benzene is particularly preferably used.

In addition, the rate of the hydrophobic solvent in the dispersion medium can be arbitrarily selected, but is, for example, 10% by mass or more and 90% by mass or less, preferably 20% by mass or more and 80% by mass or less, and more preferably 30% by mass or more and 70% by mass or less. In such a case, the mixing of the dispersion liquid and the resin component to be described below, particularly, the methyl-based silicone resin becomes easier. The rate of the hydrophobic solvent in the dispersion medium may be 60% by mass or more and 90% by mass or less, 65% by mass or more and 85% by mass or less, or 70% by mass or more and 80% by mass or less as necessary.

The hydrophilic solvent can be contained in the dispersion liquid due to, for example, a method to be described below. Examples of such a hydrophilic solvent include alcohol-based solvents, ketone-based solvents, nitrile-based solvents, and the like. It is possible to preferably use one of these singly or two or more thereof in combination.

Examples of the alcohol-based solvents include branched or linear alcohol compounds having 1 to 4 carbon atoms and ether condensates thereof. These solvents can be used singly or two or more thereof can be used in combination. In addition, an alcohol compound that is contained in the alcohol-based solvents may be any of primary, secondary and tertiary alcohols. In addition, the alcohol compound that is contained in the alcohol-based solvents may be any of monohydric, divalent, and trihydric alcohols. More specifically, preferable examples of the alcohol-based solvents include methanol, ethanol, 1-propanol, isopropyl alcohol, 1-butyl alcohol, 2-butanol, isobutyl alcohol, tert-butyl alcohol, methanediol, 1,2-ethanediol, 1,2-propanediol, 1,3-propanediol, 1,2-butanediol, 1,3-butanediol, 1,4-butanediol, 2,3-butanediol, 2-butene-1,4-diol, 1,4-butynediol, glycerin, diethylene glycol, 3-methoxy-1,2-propanediol, and the like.

Preferable examples of the ketone-based solvents include acetone, methyl ethyl ketone, methyl isobutyl ketone, cyclohexanone, and the like.

Preferable examples of the nitrile-based solvents include acetonitrile and the like.

From the viewpoint of excellent affinity to both water and the hydrophobic solvent and acceleration of the mixing thereof, the hydrophilic solvent preferably contains the alcohol-based solvent. In this case, the number of carbon atoms in the alcohol compound that configures the alcohol-based solvent is preferably 1 or more and 3 or less and more preferably 1 or more and 2 or less.

Among the above-described alcohol-based solvents, methanol and ethanol, particularly, methanol, can be preferably used since it is possible to sufficiently develop the effect of the above-described alcohol-based solvents.

In addition, the rate of the hydrophilic solvent in the dispersion medium is, for example, 10% by mass or less and preferably 7% by mass or less. The lower limit can be selected as necessary and may be 0% by mass or more and may be 1% by mass or more or 3% by mass or more.

The content of the dispersion medium in the dispersion liquid of the present embodiment can be arbitrarily selected, but is preferably 10% by mass or more and 98% by mass or less, more preferably 20% by mass or more and 80% by mass or less, and still more preferably 30% by mass or more and 70% by mass or less. The content of the dispersion medium in the dispersion medium may be 60% by mass or more and 90% by mass or less, 65% by mass or more and 85% by mass or less, or 70% by mass or more and 80% by mass or less as necessary.

(2.4 Other Components)

The dispersion liquid according to the present embodiment may contain components other than the components described above. For example, the dispersion liquid according to the present embodiment may contain, as necessary, components other than the components described above, for example, general additives such as a dispersant, a dispersion aid, an antioxidant, a flow adjuster, a viscosity improver, a pH adjuster, and a preservative.

In addition, the dispersion liquid according to the present embodiment may contain a component that may be contained due to the method to be described below, for example, an acid, water, an alcohol, and the like.

In the present specification, the dispersion liquid according to the present embodiment is differentiated from a composition according to the present embodiment that contains a resin component and is capable of forming sealing members by curing. That is, even in a case where the dispersion liquid according to the present embodiment contains the resin component to be described below, which is exemplified in the description relating to the composition, the dispersion liquid does not contain the resin component to be described below much enough to form sealing members when simply cured. More specifically, the mass ratio between the resin component and the metal oxide particles in the dispersion liquid according to the present embodiment is preferably in a range of 0:100 to 40:60, more preferably in a range of 0:100 to 30:70, and more preferably in a range of 0:100 to 20:80 (resin component metal oxide particles). The dispersion liquid according to the present embodiment particularly preferably does not essentially contain the resin component to be described below and most preferably does not contain the resin component to be described below at all.

In the dispersion liquid according to the present embodiment, the surfaces of the metal oxide particles are sufficiently modified with the silane compound and the silicone compound. In addition, the metal oxide particles modified as described above have an excellent affinity to the methyl-based silicone resin and can be relatively uniformly dispersed in the methyl-based silicone resin. Therefore, even in a case where the metal oxide particles are dispersed in the methyl-based silicone resin, the occurrence of turbidity such as white turbidity is suppressed. Furthermore, a change in the viscosity of the methyl-based silicone resin containing the metal oxide particles is also suppressed.

<3. Method for Producing Dispersion Liquid>

Next, a method for producing the dispersion liquid according to the present embodiment will be described.

The method for producing a dispersion liquid according to the present embodiment includes a first step of mixing a silane compound and water to obtain a hydrolysis liquid in which the silane compound is hydrolyzed,
  a second step of mixing the hydrolysis liquid and metal oxide particles to obtain a liquid mixture,
  a third step of dispersing the metal oxide particles in the liquid mixture to obtain a first dispersion liquid, and
  a fourth step of treating the metal oxide particles in the first dispersion liquid with a silicone compound to obtain a second dispersion liquid.

The content of the metal oxide particles in the liquid mixture is 10% by mass or more and 49% by mass or less, and a total content of the silane compound and the metal oxide particles in the liquid mixture is 65% by mass or more and 98% by mass or less.

The total content of the silane compound and the metal oxide particles can also be evaluated by the solid content.

In addition, the total content of the silane compound and the inorganic particles does not include an alcohol that is generated by the hydrolysis of the silane compound to be described below. That is, the total content of the silane compound and the inorganic particles means the total content of the silane compound, the hydrolyzed silane compound, and the inorganic particles. It is needless to say that the total content is a value including the content of the inorganic particles attached to the silane compound.

(3.1 First Step)

In the present step, at least a silane compound and water are mixed to obtain a hydrolysis liquid in which the silane compound is hydrolyzed. The use of the hydrolysis liquid in which at least a part of the silane compound is hydrolyzed in advance as described above makes it easy for the silane compound to be attached to the surfaces of the metal oxide particles in the dispersion step (third step) to be described below.

As the silane compound, one of the above-described silane compounds can be used singly or two or more thereof can be used in combination.

In addition, the content of the silane compound in the hydrolysis liquid is not particularly limited. The content of the silane compound in the hydrolysis liquid can be set to the remainder excluding the other components from the hydrolysis liquid, but the content of the silane compound in the hydrolysis liquid is, for example, 60% by mass or more and 99% by mass or less, preferably 70% by mass or more and 97% by mass or less, and more preferably 80% by mass or more and 95% by mass or less. The content of the silane compound in the hydrolysis liquid may be 85% by mass or more and 95% by mass or less or 87% by mass or more and 93% by mass or less as necessary.

In the present step, a surface-modifying material other than the silane compound may be contained in the hydrolysis liquid.

In addition, in the present step, the hydrolysis liquid contains water. Water serves as a substrate for the hydrolysis reaction of surface-modifying materials such as the silane compound.

The content of water in the hydrolysis liquid is not particularly limited and can be arbitrarily selected. For example, the content of water can be appropriately set in accordance with the amount of the surface-modifying material. For example, the amount of water that is added to the hydrolysis liquid is preferably 0.5 mol or more and 5 mol or less, more preferably 0.6 mol or more and 3 mol or less, and still more preferably 0.7 mol or more and 2 mol or less with respect to 1 mol of the surface-modifying material such as the silane compound. In such a case, it is possible to more reliably prevent the occurrence of the agglomeration of the metal oxide particles in a dispersion liquid to be produced due to the excess amount of water while causing the hydrolysis reaction of the surface-modifying material to sufficiently progress. The content of water in the hydrolysis liquid may be, for example, 1% by mass or more and 40% by mass or less, may be 3% by mass or more and 30% by mass or less, and may be 5% by mass or more and 20% by mass or less or 8% by mass or more and 13% by mass or less.

Alternatively, the content of water in the hydrolysis liquid may be, for example, 1% by mass or more and 20% by mass or less, preferably 1% by mass or more and 15% by mass or less, and more preferably 1% by mass or more and 10% by mass or less.

In addition, a catalyst may be added to the hydrolysis liquid together with the silane compound and water. The hydrolysis liquid may contain only the surface-modifying material, water, and the catalyst. As the catalyst, for example, an acid or a base can be used.

The acid catalyzes the hydrolysis reaction of the silane compound in the hydrolysis liquid. On the other hand, the base catalyzes a condensation reaction between the hydrolyzed surface-modifying material and functional groups on the surfaces of the metal oxide particles, for example, hydroxyl groups or silanol groups. These reactions make it easy for the silane compound, such as a silane compound, to be attached to the metal oxide particles in the dispersion step (third step) to be described below and improve the dispersion stability of the metal oxide particles.

Here, the above-described "acid" refers to an acid based on the so-called Bronsted-Lowry definition and refers to a substance that donates a proton in the hydrolysis reaction of the surface-modifying material such as the silane compound. In addition, the above-described "base" refers to a base based on the so-called Bronsted-Lowry definition and, here, refers herein to a substance that accepts a proton in the hydrolysis reaction of the surface-modifying material such as the silane compound and the following condensation reaction.

The acid is not particularly limited as long as the acid is capable of supplying a proton in the hydrolysis reaction of the silane compound and can be arbitrarily selected. Examples of the acid include inorganic acids such as hydrochloric acid, hydrobromic acid, hydroiodic acid, sulfuric acid, nitric acid, boric acid, and phosphoric acid and organic acids such as acetic acid, citric acid and formic acid. One of these acids can be used singly or two or more thereof can be used in combination.

The base is not particularly limited as long as the base is capable of accepting a proton in the hydrolysis reaction of the silane compound and can be arbitrarily selected. Examples thereof include sodium hydroxide, potassium hydroxide, barium hydroxide, calcium hydroxide, ammonia, amines, and the like. One of these bases can be used singly or two or more thereof can be used in combination.

Among the above-described catalysts, the acid is preferably used as the catalyst. As the acid, the inorganic acid is preferable, and hydrochloric acid is more preferable from the viewpoint of the acidity.

The content of the catalyst in the hydrolysis liquid is not particularly limited and can be arbitrarily selected. The content of the catalyst in the hydrolysis liquid may be, for example, 10 ppm or more and 1000 ppm or less, preferably 20 ppm or more and 800 ppm or less, and more preferably 30 ppm or more and 600 ppm or less. In such a case, it is possible to suppress an unintended side reaction of the silane compound while sufficiently accelerating the hydrolysis of the silane compound. The content of the catalyst in the hydrolysis liquid may be 0.1 ppm or more and 100 ppm or less or 1 ppm or more and 10 ppm or less as necessary. In addition, for example, when hydrochloric acid (1N) is used as the catalyst, the amount of hydrochloric acid in the hydrolysis liquid may be 0.001 parts by mass or more and 5 parts by mass or less, may be 0.001 parts by mass or more and 3 parts by mass or less, may be 0.005 parts by mass or more and 1 part by mass or less, or may be 0.005 parts by mass or more and 0.1 parts by mass or less with respect to 100 parts by mass of the hydrolysis liquid.

The first step may be a step of mixing only the silane compound, water, and the catalyst.

In addition, the hydrolysis liquid may contain a hydrophilic solvent as necessary. The hydrophilic solvent is capable of further accelerating the hydrolysis reaction of the surface-modifying material by accelerating the mixing of water and the silane compound in the hydrolysis liquid.

Examples of such a hydrophilic solvent include a variety of hydrophilic solvents that can be contained in the above-described dispersion liquid.

Among the above-described hydrophilic solvents, the hydrophilic solvent is preferably one or more selected from the group consisting of alcohol-based solvents and more preferably one or more selected from the group consisting of methanol and ethanol from the viewpoint of having excellent affinity to both water and hydrophobic solvents and accelerating the mixing thereof. The hydrophilic solvent may be made of an alcohol-based solvent alone.

In addition, the content of the hydrophilic solvent in the hydrolysis liquid is not particularly limited and can be, for example, 60% by mass or less and preferably 50% by mass or less. In this range, it is possible to sufficiently increase the content of the surface-modifying material and water in the hydrolysis liquid. The content of the hydrophilic solvent may be 40% by mass or less, 20% by mass or less, 10% by mass or less, or 5% by mass or less. In addition, the content of the hydrophilic solvent in the hydrolysis liquid can be, for example, 10% by mass or more and preferably 15% by mass or more. In this range, it is possible to further accelerate the mixing of the surface-modifying material and water and, consequently, to cause the hydrolysis reaction of the surface-modifying material to efficiently progress. The hydrolysis liquid may not contain any hydrophilic solvents except for a compound derived from the hydrolysis reaction. That is, only a hydrophilic solvent that is a compound derived from the hydrolysis reaction may be contained.

In the present embodiment, in the case of using a silane compound having an alkoxy group as the silane compound, since this silane compound is hydrolyzed, an alcohol compound derived from the alkoxy group is contained in the liquid mixture. Since the hydrolysis reaction progresses even in metal oxide particle-adsorbed water and thus can occur in any of the first step to the fourth step. Therefore, in this case, an alcohol compound is contained in a dispersion liquid to be obtained unless a step of removing the alcohol compound is provided.

In the present step, after being prepared, the hydrolysis liquid may be held at a certain temperature that is arbitrarily selected for a predetermined time. This makes it possible for the hydrolysis of the silane compound to be further accelerated.

In this treatment, the temperature of the hydrolysis liquid is not particularly limited, can be arbitrarily selected, and can be appropriately changed depending on the kind of the silane compound. For example, the temperature of the hydrolysis liquid is 5° C. or higher and 65° C. or lower, more preferably 20° C. or higher and 65° C. or lower, and further preferably 30° C. or higher and 60° C. or lower. The temperature of the hydrolysis liquid may be 40° C. or higher and 75° C. or lower or 50° C. or higher and 70° C. or lower as necessary.

In addition, the holding time at the above-described temperature is not particularly limited and is, for example, 10 minutes or longer and 180 minutes or shorter and preferably 30 minutes or longer and 120 minutes or shorter.

The holding time may be 15 minutes or longer and 60 minutes or shorter or 20 minutes or longer and 40 minutes or shorter as necessary.

While the hydrolysis liquid is being held, the hydrolysis liquid may be appropriately stirred.

(3.2 Second Step)

In the present step, the hydrolysis liquid and metal oxide particles are mixed to obtain a liquid mixture. The liquid mixture is preferably made up of only the hydrolysis liquid and the metal oxide particles. The second step may be a step of mixing only the hydrolysis liquid obtained in the first step and metal oxide particles.

In this step, the hydrolysis liquid and the metal oxide particles are mixed such that the content of the metal oxide particles in the liquid mixture is 10% by mass or more and 49% by mass or less and the total content of the silane compound and the metal oxide particles is 65% by mass or more and 98% by mass or less. The amounts and proportions of the individual materials may be adjusted in advance such that the above-described contents are satisfied in the mixing step.

As described above, in the present embodiment, the total content of the silane compound and the metal oxide particles in the liquid mixture is 65% by mass or more and 98% by mass or less, which is extremely large. In addition, an organic solvent or a dispersion medium such as water that has been regarded as essential in the related art is not contained in the liquid mixture or is contained in an extremely small amount compared with the related art. Alternatively, a small amount of an unavoidable alcohol compound is contained due to the hydrolysis. The present inventors found that, even in such a case, the metal oxide particles undergo the dispersion step (third step) in the liquid mixture, whereby the metal oxide particles can be uniformly dispersed, and the silane compound can be uniformly attached to the metal oxide particles (surface modification).

In more detail, generally, in a case where metal oxide particles are surface-modified with a surface-modifying material in a liquid phase, it is common to mix not only the metal oxide particles and the surface-modifying material but also a dispersion medium to obtain a liquid mixture and disperse this liquid mixture using a disperser. When the metal oxide particles which have been surface-modified by such a method are mixed with a methyl-based silicone resin, the metal oxide particles cannot be sufficiently dispersed in the methyl-based silicone resin and agglomerate, which has resulted in a problem of the occurrence of turbidity such as white turbidity in the methyl-based silicone resin. In such a case, the metal oxide particles that are added do not sufficiently exhibit intended performance.

The dispersion medium is usually added for the purpose of decreasing the viscosity of the liquid mixture, uniformly dispersing the metal oxide particles, and uniformly modifying the surfaces of the inorganic particles with the surface-modifying material. In the related art, it has been considered that, in the case of not using a dispersion medium, the viscosity of the dispersion liquid increases, and consequently, the surface-modifying material is not sufficiently attached to the surfaces of the metal oxide particles. Surprisingly, the present inventors found that it is possible to uniformly disperse metal oxide particles in a dispersion liquid to be obtained and uniformly modify the metal oxide particles with a silane compound by directly dispersing the metal oxide particles in a high concentration of the silane compound while using no dispersion medium or only a small amount of a dispersion medium that has been regarded as essential in the related art as described above.

The silane compound has a low molecular weight and a relatively low viscosity. Furthermore, the silane compound is hydrolyzed in the first step described above and thereby has a favorable property of being attached to the metal oxide particles. Therefore, the silane compound is extremely preferable for dispersion of the metal oxide particles in a high concentration of the surface-modifying material.

In a case where the total content of the silane compound and the metal oxide particles is less than 65% by mass, since the amount of components other than the above-described two components, for example, the dispersion medium becomes too large, there is a strong tendency that it is not possible to sufficiently attach the silane compound to the surfaces of the metal oxide particles in the dispersion step (third step) to be described below. As a result, a large number of hydroxyl groups remain on the surfaces of the metal oxide particles, and, when a dispersion that is obtained by dispersion is mixed with a hydrophobic material afterwards, the metal oxide particles agglomerate, and the hydrophobic material becomes turbid. The total content of the silane compound and the metal oxide particles needs to 65% by mass or more and is preferably 70% by mass or more and more preferably 75% by mass or more. The total content of the silane compound and the metal oxide particles may be 80% by mass or more, 85% by mass or more, 90% by mass or more, or 92% by mass or more as necessary.

In contrast, when the total content of the silane compound and the metal oxide particles exceeds 98% by mass, the viscosity of the liquid mixture becomes too high, and there is a strong tendency that it is not possible to sufficiently attach the silane compound to the surfaces of the metal oxide particles in the dispersion step (third step) to be described below. The total content of the silane compound and the metal oxide particles may be 98% by mass or less and is preferably 97% by mass or less and more preferably 95% by mass or less. The total content of the silane compound and the metal oxide particles may be 90% by mass or less, 85% by mass or less, 80% by mass or less, or 75% by mass or less as necessary.

In addition, as described above, the content of the metal oxide particles in the liquid mixture is 10% by mass or more and 49% by mass or less. With such a range, it is possible to control the amount of the silane compound with respect to the metal oxide particles to be within an appropriate range, to uniformly attach the silane compound to the surfaces of the metal oxide particles, and to suppress an increase in the viscosity of the liquid mixture. The silane compound in the liquid mixture may be 16% by mass or more and 88% by mass or less.

On the other hand, in a case where the content of the metal oxide particles in the liquid mixture is less than 10% by mass, the amount of the silane compound becomes excessive with respect to the metal oxide particles, and there is a strong tendency for the excess silane compound to induce the agglomeration of the metal oxide particles in a dispersion liquid to be obtained. The content of the metal oxide particles in the liquid mixture is preferably 20% by mass or more, still more preferably 23% by mass or more, still more preferably 26% by mass or more, and particularly more preferably 30% by mass or more.

In addition, when the content of the metal oxide particles exceeds 49% by mass, the amount of the silane compound is insufficient with respect to the metal oxide particles, and a sufficient amount of the silane compound is not attached to the metal oxide particles. In addition, the content of the metal oxide particles becomes too large, consequently, the viscosity of the liquid mixture becomes too high, and there is a strong tendency that it is not possible to sufficiently disperse the metal oxide particles in the dispersion step (third step) to be described below. The content of the metal oxide particles in the liquid mixture is preferably 45% by mass or less, more preferably 40% by mass or less, still more preferably 38% by mass or less, and particularly preferably 36% by mass or less. The content of the metal oxide particles in the liquid mixture may be 34% by mass or less.

The ratio of the content of the silane compound to the content of the metal oxide particles in the liquid mixture is not particularly limited, but is, for example, 100% by mass or more and 800% by mass or less, preferably 140% by mass or more and 600% by mass or less, more preferably 180% by mass or more and 400% by mass or less, and particularly preferably 200% by mass or more and 270% by mass or less with respect to the amount of the metal oxide particles. In such a case, it is possible to control the amount of the silane compound with respect to the metal oxide particles to be within an appropriate range and to uniformly attach the silane compound to the surfaces of the metal oxide particles.

In addition, in the present step, an organic solvent may be further mixed with the liquid mixture. When the organic solvent is mixed with the liquid mixture, it becomes possible to control the reactivity of the surface-modifying material, and it becomes possible to control the degree of attachment of the surface-modifying material to the surfaces of the metal oxide particles. Furthermore, it becomes possible to adjust the viscosity of the liquid mixture with the organic solvent.

Examples of such an organic solvent include the organic solvents exemplified as the dispersion medium of the dispersion liquid according to the present embodiment described above, and one of them can be used singly or two or more thereof can be used in combination.

The content of the organic solvent in the liquid mixture is not particularly limited as long as it satisfies the contents of the metal oxide particles and the silane compound are satisfied. It is needless to say that the organic solvent may not be contained in the liquid mixture.

The mixing time or mixing temperature in the mixing step can be arbitrarily selected. For example, the mixing may be carried out at room temperature or the materials may be well mixed and then stirred for approximately 0 to 600 seconds.

(3.3 Third Step)

Next, the metal oxide particles are dispersed in the liquid mixture to obtain a first dispersion liquid in which the metal oxide particles are dispersed. In the present embodiment, the metal oxide particles are dispersed in a high concentration of the hydrolyzed silane compound. Therefore, in the first dispersion liquid to be obtained, the silane compound is relatively uniformly attached to the surfaces of the metal oxide particles, and the metal oxide particles are relatively evenly dispersed.

The metal oxide particles can be dispersed by a well-known dispersion method, for example, the use of a well-known disperser. As the disperser, for example, a bead mill, a ball mill, a homogenizer, a disperser, a stirrer, or the like is preferably used. The third step is preferably a step of dispersing only the mixture obtained in the mixing step.

Here, in the present step, the metal oxide particles are preferably dispersed by imparting the minimum necessary amount of energy without imparting excess energy such that the particle diameters (dispersed-particle diameters) of the metal oxide particles become almost uniform in the dispersion liquid.

The dispersion time can be arbitrarily selected depending on conditions, may be, for example, 6 to 18 hours, and is preferably 8 to 12 hours and more preferably 10 to 11 hours. However, the dispersion time is not limited only thereto.

The dispersion temperature can be arbitrarily selected, may be, for example, 10° C. to 50° C., and is preferably 20° C. to 40° C. and more preferably 30° C. to 40° C. However, the dispersion temperature is not limited only thereto.

A difference of the dispersion step from the mixing step is that the metal oxide particles are continuously dispersed over a certain period of time.

(3.4 Fourth Step)

Next, the metal oxide particles are treated with a silicone compound to obtain a second dispersion liquid. As described above, the dispersion liquid in which the silane compound is relatively uniformly attached to the surfaces of the metal oxide particles is obtained in the third step. Therefore, the silicone compound can be relatively uniformly attached to the surfaces of the metal oxide particles through the silane compound.

In the present step, first, the first dispersion liquid and a silicone compound are mixed to obtain a treatment liquid. Next, the treatment liquid may be held at a constant temperature for a predetermined time. The treatment liquid may be stirred as necessary. These treatments make it possible to further accelerate the attachment of the silicone compound to the metal oxide particles.

Examples of the silicone compound include the above-described silicone compounds. One of these can be used singly or two or more thereof can be used in combination.

The silicone compound can be added to and mixed with the first dispersion liquid such that the content of the silicone compound in the second dispersion liquid becomes, for example, 50% by mass or more and 300% by mass or less and preferably becomes 70% by mass or more and 130% by mass or less with respect to the metal oxide particles. The content of the silicone compound in the second dispersion liquid may be 60% by mass or more and 100% by mass or less or 65% by mass or more and 85% by mass or less as necessary. Such a treatment makes it possible to attach a sufficient amount of the silicone compound to the surfaces of the metal oxide particles and to improve the dispersion stability of the metal oxide particles and improve the dispersibility into the methyl-based silicone resin. Furthermore, it is possible to reduce the amount of an isolated silicone compound and to suppress unintentional agglomeration of the metal oxide particles in the methyl-based silicone resin.

In this treatment, the holding temperature is not particularly limited and can be appropriately changed depending on the kind of the silicone compound. For example, the holding temperature is 40° C. or higher and 130° C. or lower and preferably 50° C. or higher and 120° C. or lower.

In addition, the holding time is not particularly limited, but is, for example, 1 hour or longer and 24 hours or shorter and preferably 2 hours or longer and 20 hours or shorter.

During the above-described holding, the second dispersion liquid may be appropriately stirred.

In addition, in the present step, the treatment with the silicone compound may be carried out a plurality of times. For example, when the treatment with the silicone compound is carried out a plurality of times using different kinds of silicone compounds, the control of the surface state of the metal oxide particles in accordance with the kind of the methyl-based silicone resin becomes easier.

In the fourth step, the second dispersion liquid may contain a dispersion medium, for example, the above-described aromatic hydrocarbon such as toluene as necessary. The amount of the dispersion medium in the second dispersion liquid can be arbitrarily selected and is, for example, 20% by mass or more and 80% by mass or less, preferably 30% by mass or more and 70% by mass or less, and more preferably 40% by mass or more and 60% by mass or less.

As described above, the metal oxide particles are treated with the silicone compound, and the second dispersion liquid can be obtained. This second dispersion liquid may be obtained as the dispersion liquid according to the present embodiment. The second dispersion liquid may be obtained as the dispersion liquid according to the present embodiment by carrying out a post treatment such as a fifth step below as necessary.

(3.5 Fifth Step)

In the present step, the second dispersion liquid obtained in the fourth step and a hydrophobic solvent are mixed to obtain a third dispersion liquid. As the hydrophobic solvent, one of the hydrophobic solvents that are used for the dispersion liquid according to the present embodiment described above can be used singly or in two or more thereof can be used in combination.

In addition, the amount of the hydrophobic solvent mixed is not particularly limited, can be arbitrarily selected, and can be appropriately set in accordance with the content of the hydrophobic solvent that is contained in the dispersion liquid according to the present embodiment to be obtained.

The dispersion liquid according to the present embodiment as described above can be obtained as the third dispersion liquid as described above.

In the third dispersion liquid, as the hydrophobic solvent, the above-described dispersion medium, for example, the above-described aromatic hydrocarbon such as toluene may be used. The amount of the hydrophobic solvent in the third dispersion liquid can be arbitrarily selected and is, for example, 20% by mass or more and 80% by mass or less, preferably 30% by mass or more and 70% by mass or less, and more preferably 40% by mass or more and 60% by mass or less.

In the dispersion liquid produced using the method according to the present embodiment, the metal oxide particles are uniformly dispersed, and the surfaces of the metal oxide particles are uniformly and sufficiently modified with the silane compound and the silicone compound. In addition, the metal oxide particles modified as described above have an excellent affinity to the methyl-based silicone resin and can be relatively uniformly dispersed in the methyl-based silicone resin. Therefore, even in a case where the metal oxide particles are dispersed in the methyl-based silicone resin, the occurrence of turbidity such as white turbidity is suppressed. Furthermore, a change in the viscosity of the methyl-based silicone resin containing the metal oxide particles is also suppressed.

Components other than the components described above, for example, general additives such as a dispersant, a dispersion aid, an antioxidant, a flow adjuster, a viscosity improver, a pH adjuster, and a preservative may be mixed with the dispersion liquid according to the present embodiment as necessary. These can be added in an arbitrary step as necessary.

As described above, in the dispersion liquid of the present embodiment, it has become possible to mix the metal oxide particles with a hydrophobic material by using the step of directly dispersing the metal oxide particles in the silane compound. It is assumed that, in the dispersion liquid of the present embodiment, a large amount of the silane compound is attached to the metal oxide particles and dense coatings are formed compared with dispersion liquids of the related art. However, the details of exactly what state the surfaces of the metal oxide particles are in in the dispersion liquid and how the dispersion liquid can be more favorably mixed with the hydrophilic material depending on the surface state are unclear. It is difficult to directly specify the characteristics of the dispersion liquid of the present embodiment with the state of the surfaces of the metal oxide particles modified with the silane compound and the silicone compound.

A dispersion liquid of the present invention contains metal oxide particles, one or more silane compounds and one or more silicone compounds that are at least partially attached to the metal oxide particles, and a hydrophobic solvent as necessary. The capability of the metal oxide particles being mixed with the hydrophobic material is assumed to be developed due to complicated entanglements between a number of factors. When these are taken into account, it is difficult to collectively describe, by words, the state of the surfaces of the metal oxide particles for making it possible to mix the metal oxide particles with the hydrophobic material. The present inventor also found a method for specifying a preferable state of the metal oxide particles with a spectrum as described below.

<4. Composition>

Next, a composition according to the present embodiment will be described. The composition according to the present embodiment is a composition that is obtained by mixing the above-described dispersion liquid and a resin component. Therefore, the composition according to the present embodiment contains a resin component, that is, a resin and/or a precursor thereof in addition to the above-described metal oxide particles which have been surface-modified with the above-described silane compound and silicone compound.

The composition according to the present embodiment can be used as a sealing member for light-emitting elements by being cured as described below. The composition according to the present embodiment contains the above-described metal oxide particles contributing to improvement in the refractive index and transparency and is thus capable of improving the brightness of light of light-emitting devices when being used for sealing members.

Furthermore, the composition according to the present embodiment contains metal oxide particles which have been surface-modified with the above-described silane compound and silicone compound. Therefore, even when a methyl-based silicone resin is contained as the resin component, the agglomeration of the metal oxide particles is suppressed and the deterioration of transparency is suppressed. Therefore, it is possible to improve the brightness of light of light-emitting devices at the time of using the composition according to the present embodiment for sealing members.

The content of the metal oxide particles in the composition of the present embodiment can be arbitrarily selected. From the viewpoint of obtaining a highly transparent composition, the content of the metal oxide particles is preferably 5% by mass or more and 50% by mass or less, more preferably 5% by mass or more and 40% by mass or less, and still more preferably 10% by mass or more and 35% by mass or less. The content of the metal oxide particles may be 1% by mass or more and 20% by mass or less or 3% by mass or more and 15% by mass or less as necessary.

In addition, the content of the surface-modifying material such as the silane compound and the silicone compound in the composition can correspond to the content in the dispersion liquid according to the present embodiment.

The resin component is a main component in the composition according to the present embodiment. The resin component is cured to seal light-emitting elements when the composition according to the present embodiment is used as a sealing material. As a result, the resin component prevents deterioration factors from external environments such as moisture and oxygen from reaching the light-emitting elements. In addition, in the present embodiment, a cured substance that is obtained from the resin component is basically transparent and is capable of transmitting light that is emitted from light-emitting elements.

Such a resin component is not particularly limited as long as the resin component can be used as a sealing material. For example, one of resins such as a silicone resin or an epoxy resin can be used singly or two or more thereof can be used in combination. In particular, from the viewpoint of durability, a silicone resin, particularly, a methyl-based silicone resin is preferable.

As the methyl-based silicone resin, for example, a dimethyl-based silicone resin, a methyl phenyl silicone resin, or the like can be used.

The proportion of the methyl-based silicone resin in the resin component needs to be adjusted depending on desired characteristics and is not particularly limited. For example, the proportion may be 100% by mass, may be 20% by mass or more and 80% by mass or less, may be 30% by mass or more and 70% by mass or less, or may be 40% by mass or more and 60% by mass or less. In the related art, when metal oxide particles are contained in the methyl-based silicone resin, the metal oxide particles agglomerate, the transparency deteriorates, and the refractive index does not sufficiently improve. In contrast, the composition according to the present embodiment contains metal oxide particles which have been surface-modified with the above-described silane compound and silicone compound. Therefore, even when the methyl-based silicone resin is contained as the resin component in a large amount as described above, the agglomeration of the metal oxide particles is suppressed and the deterioration of transparency is suppressed. In addition, since it becomes possible to employ the methyl-based silicone resin, the durability of sealing members that are formed using the composition improves.

The structure of the resin component may be a two-dimensional chain-like structure, may be a three-dimensional net-like structure, or may be a basket-like structure.

The resin component needs to be in a cured polymer form when used as a sealing member. In the composition, the resin component may be in an uncured state, that is, may be a precursor. Therefore, the resin component that is present in the composition may be, for example, a monomer, may be an oligomer, or may be a polymer.

As the resin component, an addition reaction-type resin may be used, a condensation reaction-type resin may be used, or a radical polymerization reaction-type resin may be used.

The viscosity of the resin component at 25° C., which is measured according to JIS Z 8803:2011, is, for example, 10 mPa·s or more and 100,000 mPa·s or less, preferably 100 mPa·s or more and 10,000 mPa·s or less, and more preferably 1,000 mPa·s or more and 7,000 mPa·s or less.

In addition, the content of the resin component in the composition according to the present embodiment can be set to be the remainder of the other components and is, for example, 10% by mass or more and 70% by mass or less.

The mass ratio between the resin component and the metal oxide particles in the composition according to the present embodiment can be arbitrarily selected and is, for example, preferably in a range of 50:50 to 90:10 and more preferably in a range of 60:40 to 80:20 (resin component : metal oxide particles).

The dispersion medium derived from the dispersion liquid according to the present embodiment may be contained in or removed from the composition according to the present embodiment. That is, the dispersion medium derived from the dispersion liquid may be completely removed. The dispersion medium may remain in the composition in an amount of approximately 1% by mass or more and 10% by mass or less or may remain in an amount of approximately 2% by mass or more and 5% by mass or less.

In addition, the composition according to the present embodiment may contain the particles of a fluorescent body as long as the object of the present invention is not impaired. The particles of a fluorescent body absorb light having a specific wavelength that is emitted from light-emitting elements and release light having a predetermined wavelength. That is, it becomes possible to convert the wavelength of light and, furthermore, adjust the color tone with the particles of a fluorescent body.

The particles of a fluorescent body are not particularly limited as long as the particles can be used light-emitting devices as described below, can be arbitrarily selected, and can be appropriately selected and used such that the color of light emitted from light-emitting devices becomes a desired color.

The content of the particles of a fluorescent body in the composition according to the present embodiment can be appropriately adjusted and used such that a desired brightness can be obtained.

In addition, the composition according to the present embodiment may also contain an additive that is generally used such as a preservative, a polymerization initiator, a polymerization inhibitor, a curing catalyst, or a light scattering agent as long as the object of the present invention is not impaired. As the light scattering agent, silica particles having an average particle diameter of 1 to 30 µm are preferably used.

The composition according to the present embodiment can be produced by mixing the dispersion liquid according to the present embodiment and the resin component. In addition, after the mixing, the dispersion medium contained in the dispersion liquid may be removed with an evaporator or the like as necessary.

The composition according to the present embodiment contains the metal oxide particles which have been surface-modified with the above-described silane compound and silicone compound. As a result, even when the methyl-based silicone resin is contained as the resin component, the agglomeration of the metal oxide particles is suppressed and the deterioration of transparency is suppressed. Therefore, it is possible to form sealing members that improve the brightness of light of light-emitting devices using the composition according to the present embodiment.

The methyl-based silicone resin used in the above description may mean, for example, a methyl-based silicone resin in which a siloxane bond that alternately bonds silicon and oxygen is present as a main skeleton and a number of functional groups that bond to Si atoms, for example, 60% or more, preferably, 80% or more of functional groups are methyl groups. However, the methyl-based silicone resin is not limited only to this example.

<5. Sealing Member>

A sealing member according to the present embodiment is a cured substance of the composition according to the present embodiment. The sealing member according to the present embodiment is generally used as a sealing member that is disposed on light-emitting elements or a part thereof.

The thickness or shape of the sealing member according to the present embodiment can be appropriately adjusted depending on desired uses or characteristics and is not particularly limited.

The sealing member according to the present embodiment can be produced by curing the composition according to the present embodiment as described above. A method for curing the composition can be selected depending on the characteristics of the resin component in the composition according to the present embodiment. Examples thereof include thermal curing, electron beam curing, and the like. When described more specifically, the sealing member of the present embodiment can be obtained by curing the resin component in the composition according to the present embodiment by an addition reaction or a polymerization reaction.

The average dispersed-particle diameter of the metal oxide particles in the sealing member is preferably 10 nm or more and 300 nm or less, more preferably 20 nm or more and 250 nm or less, and still more preferably 30 nm or more and 200 nm or less.

The average dispersed-particle diameter of the metal oxide particles in the sealing member is a number distribution-based average particle diameter (median diameter) which is measured by the transmission electron microscopic observation (TEM) of the sealing member. In addition, the average dispersed-particle diameter of the metal oxide particles in the sealing member in the present embodiment is a value that is measured and calculated based on the dispersed-particle diameters of the metal oxide particles in the sealing member. The average dispersed-particle diameter is measured and calculated based on the diameters of the metal oxide particles in a dispersed state regardless of whether the metal oxide particles are in a primary particle or secondary particle state. In addition, in the present embodiment, the average particle diameter of the metal oxide particles in the sealing member may be measured as the average particle diameter of the metal oxide particles to which the surface-modifying material to be described below has been attached. In the sealing member, the metal oxide particles to which the surface-modifying material has been attached and the metal oxide particles to which the surface-modifying material is not attached can be present. Therefore, usually, the average particle diameter of the metal oxide particles in the sealing member is measured as a value in a mixed state thereof.

The sealing member according to the present embodiment is a cured substance of the composition according to the present embodiment and is thus excellent in terms of the refractive index and transparency. Therefore, according to the present embodiment, it is possible to obtain a sealing member having an excellent extraction efficiency that improves the brightness of light of light-emitting devices.

<6. Light-Emitting Device>

Next, a light-emitting device according to the present embodiment will be described. The light-emitting device according to the present embodiment includes the above-described sealing member and a light-emitting element sealed with the sealing member.

Examples of the light-emitting element include a light-emitting diode (LED), an organic light-emitting diode (OLED), and the like. Particularly, the sealing member according to the present embodiment is suitable for the sealing of light-emitting diodes.

Hereinafter, the light-emitting device according to the present embodiment will be described using an example in which the light-emitting element is a light-emitting diode on a chip, that is, an LED chip, and the light-emitting device is an LED package. FIGS. 1 to 4 each are schematic views (cross-sectional views) showing examples of the light-emitting device according to the embodiment of the present invention. The sizes of individual members in the drawings are appropriately stressed in order to facilitate the description and do not indicate actual dimensions and ratios between the members. In the present specification and the drawings, configurational elements having substantially the same functional configuration will be given the same reference sign and will not be described again.

A light-emitting device (LED package) 1A shown in FIG. 1 includes a substrate 2 having a recess portion 21, a light-emitting element (LED chip) 3 that is disposed on a bottom surface of the recess portion 21 of the substrate 2, and a sealing member 4A that seals and covers the light-emitting element 3 in the recess portion 21.

The sealing member 4A is configured using the above-described sealing member according to the present embodiment. Therefore, in the sealing member 4A, the above-described metal oxide particles derived from the composition according to the present embodiment are dispersed, and, consequently, the extraction efficiency of light in the light-emitting device 1A improves. In addition, particles of a fluorescent body 5 are dispersed in the sealing member 4A. The particles of a fluorescent body 5 convert the wavelength of at least a part of light that is released from the light-emitting element 3.

Figure 2:
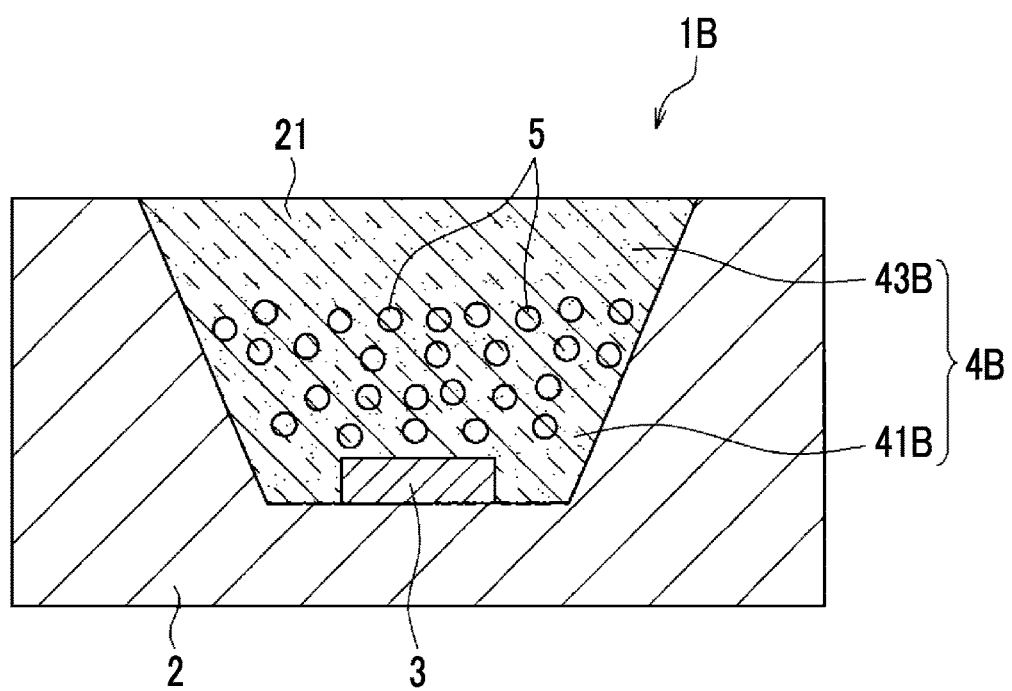
FIG. 2 is a schematic cross-sectional view showing another example of the light-emitting device according to the embodiment of the present invention.

A light-emitting device 1B shown in FIG. 2 is different from the light-emitting device 1A in terms of the fact that a sealing member 4B forms two layers. That is, the sealing member 4B has a first layer 41B that directly covers the light-emitting element 3 and a second layer 43B that covers the first layer 41B. The first layer 41B and the second layer 43B are both the sealing member according to the present embodiment. The particles of a fluorescent body 5 are dispersed in the first layer 41B. On the other hand, the second layer 43B does not include the particles of a fluorescent body 5. In the light-emitting device 1B, the above-described metal oxide particles derived from the composition according to the present embodiment are dispersed in the first layer 41B and the second layer 43B that configure the sealing member 4B, whereby the brightness of light improves.

Figure 3:
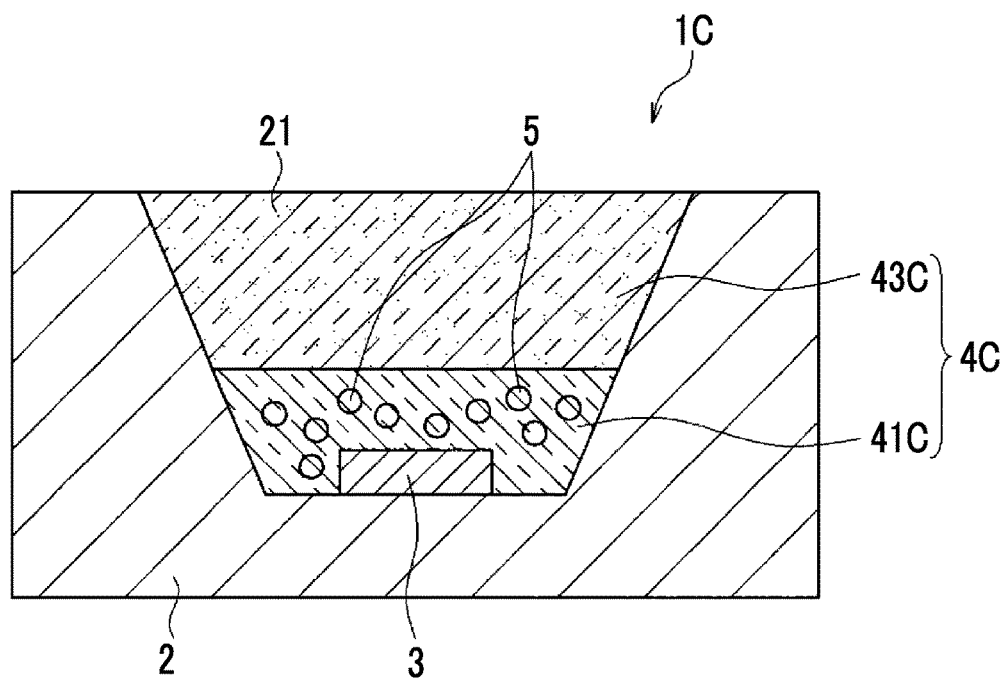
FIG. 3 is a schematic cross-sectional view showing still another example of the light-emitting device according to the embodiment of the present invention.

A light-emitting device 1C shown in FIG. 3 is also different from the light-emitting device 1A in terms of the fact that the configuration of a sealing member 4C is different from that of the sealing member 4A. The sealing member 4C has a first layer 41C that directly covers the light-emitting element 3 and a second layer 43C that covers the first layer 41C. The first layer 41C is not the sealing member according to the present embodiment, is a sealing member of a resin not containing the above-described metal oxide particles, and is configured using a different resin or the like that can be used for sealing members. In addition, the particles of a fluorescent body 5 are dispersed in the first layer 41C. On the other hand, the second layer 43C is the sealing member according to the present embodiment. In the light-emitting device 1C, the above-described metal oxide particles derived from the composition according to the present embodiment are dispersed in the second layer 43C that configures the sealing member 4C, whereby the extraction efficiency of light improves.

Figure 4:
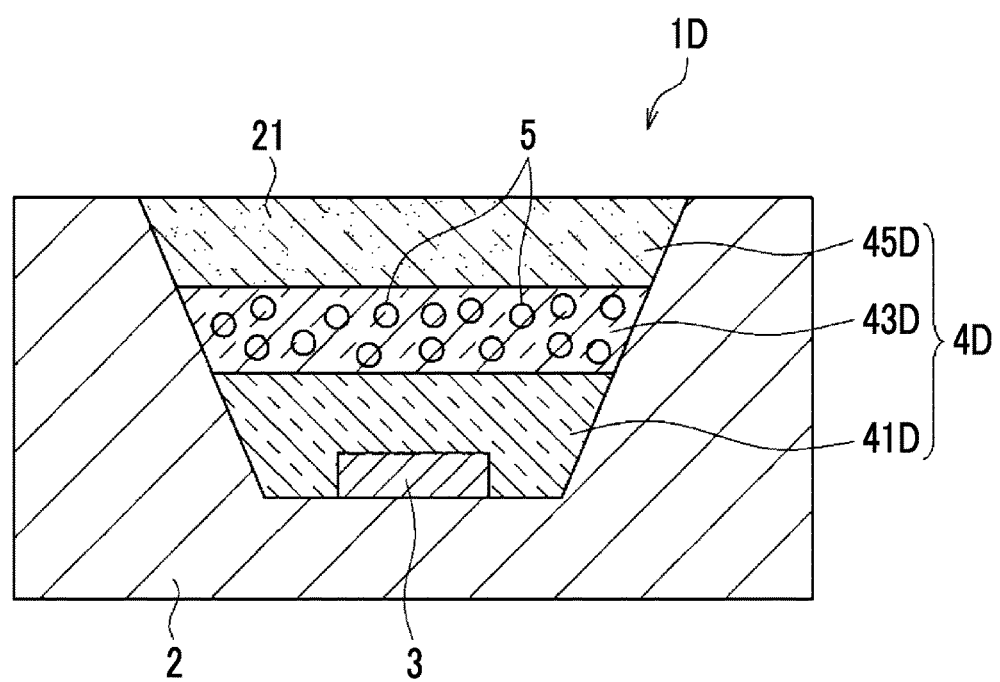
FIG. 4 is a schematic cross-sectional view showing far still another example of the light-emitting device according to the embodiment of the present invention.

In a light-emitting device 1D shown in FIG. 4, a sealing member 4D has a first layer 41D that directly covers the light-emitting element 3, a second layer 43D that covers the first layer 41D, and a third layer 45D that further covers the second layer 43D. The first layer 41D and the second layer 43D are not the sealing member according to the present embodiment, are a sealing member of a resin not containing the above-described metal oxide particles, and are configured using a different resin or the like that can be used for sealing members. In addition, the particles of a fluorescent body 5 are dispersed in the second layer 43D. On the other hand, the third layer 45D is the sealing member according to the present embodiment. In the light-emitting device 1D, the above-described metal oxide particles derived from the composition according to the present embodiment are dispersed in the third layer 45D that configures the sealing member 4D, whereby the brightness of light improves.

The light-emitting device according to the present embodiment is not limited to the aspects shown in the drawings. For example, the light-emitting device according to the present embodiment may not include the particles of a fluorescent body in the sealing member. In addition, the sealing member according to the present embodiment can be present in an arbitrary location in the sealing member.

In the light-emitting device according to the present embodiment, since the light-emitting element is sealed with the sealing member of the present embodiment, the brightness of light improves.

In the light-emitting device according to the present embodiment, the light-emitting element is sealed with the above-described composition according to the present embodiment. Therefore, the present invention also relates to a method for producing a light-emitting device, the method having a step of sealing a light-emitting element using the composition according to the present embodiment in a sense. In the same sense, the above-described production method may also have a step of mixing the dispersion liquid according to the present embodiment and a resin component to obtaining the composition.

The light-emitting element can be sealed by, for example, imparting the composition according to the present embodiment onto the light-emitting element using a dispenser or the like and then curing the composition.

The above-described light-emitting device according to the present embodiment can be used in, for example, illumination tools and display devices. Therefore, the present invention also relates to an illumination tool or a display device including the light-emitting device according to the present embodiment in a sense.

Examples of the illumination tool include an ordinary illumination tool such as an indoor lamp or an outdoor lamp, an illumination in a switch portion of an electronic device such as a mobile phone or OA equipment, and the like.

The illumination tool according to the present embodiment includes the light-emitting device according to the present embodiment. Therefore, even when the same light-emitting element is used, the luminous flux being emitted becomes large compared with that in the related art, and it is possible to make the ambient environment brighter.

Examples of the display device include a mobile phone, a mobile information terminal, an electronic dictionary, a digital camera, a computer, a television, a peripheral device thereof, and the like.

The display device according to the present embodiment includes the light-emitting device according to the present embodiment. Therefore, even when the same light-emitting element is used, the luminous flux being emitted becomes large compared with that in the related art, and it is possible to carry out displaying, for example, in a clearer and brighter manner.

EXAMPLES

Hereinafter, the present invention will be described in more detail using examples. The examples to be described below are simply examples of the present invention and do not limit the present invention.

Example 1

(1. Production of Dispersion Liquid)
(i) First Step 90.78 Parts by mass of methyltrimethoxysilane (manufactured by Shin-Etsu Chemical Co., Ltd., product name: KBM-13), 9.21 parts by mass of water, and 0.01 parts by mass of hydrochloric acid (1N) were prepared. These were added to a container and mixed together to obtain a hydrolysis liquid. Next, this hydrolysis liquid was stirred at 60° C. for 30 minutes, and a hydrolysis treatment of methyltrimethoxysilane was carried out, thereby obtaining a hydrolysis liquid.

(ii) Second Step

30 Parts by mass of zirconium oxide particles having an average primary particle diameter of 12 nm (manufactured by Sumitomo Osaka Cement Co., Ltd.) and 70 parts by mass of the hydrolysis liquid were mixed to obtain a liquid mixture. The content of the zirconium oxide particles in the liquid mixture was 30% by mass, the content of methyltrimethethoxysilane was 63.5% by mass, and therefore the total content of the zirconium oxide particles and the methyltrimethoxysilane was 93.5% by mass.

(iii) Third Step

This liquid mixture was dispersed with a bead mill for 10 hours at room temperature. After this, beads were removed, and a first dispersion liquid was obtained.

As a result of measuring the solid content of the first dispersion liquid (residual component after being heated at 100° C. for 1 hour), the amount of the solid content was 70% by mass.

(Particle Size Distribution of First Dispersion Liquid)

A part of the obtained first dispersion liquid was collected, and D10, D50, and D90 of the first dispersion liquid adjusted with methanol such that the solid content became 5% by mass were measured using a particle size distribution meter (manufactured by HORIBA, Ltd. Model No.: SZ-100SP). As a result, D10 was 15 nm, D50 was 65 nm, and D90 was 108 nm. It is conceivable that the particles that were contained in the first dispersion liquid were basically only zirconium oxide particles to which methyltriethoxysilane was attached. From this fact, the measured D10, D50, and D90 were considered to be D10, D50, and D90 of the zirconium oxide particles to which methyltriethoxysilane was attached.

(iv) Fourth Step 39.0 Parts by mass of the first dispersion liquid, 8.6 parts by mass of a methoxy group-containing phenyl silicone resin (manufactured by Shin-Etsu Chemical Co., Ltd., KR217), and 52.4 parts by mass of toluene were mixed to obtain a treatment liquid. This treatment liquid was mixed and stirred at 110° C. for 18 hours to obtain a second dispersion liquid.

(v) Fifth Step

The solid content of the obtained second dispersion liquid was measured, toluene was added such that the solid content became 30% by mass, and the components were simply mixed. As a result, a dispersion liquid (third dispersion liquid) according to Example 1 was obtained.

(2. Evaluation of Dispersion Liquid)
(i) Particle Size Distribution

A part of the obtained dispersion liquid according to Example 1 was collected, and toluene was further added thereto, thereby preparing a dispersion liquid having a solid content adjusted to 5% by mass. D10, D50, and D90 of this dispersion liquid were measured using a particle size distribution meter (manufactured by Horiba, Ltd., Model No.: SZ-100SP). As a result, D10 was 54 nm, D50 was 108 nm, and D90 was 213 nm. It is conceivable that the particles that were contained in the dispersion liquid were basically only zirconium oxide particles to which a surface-modifying material (methyltriethoxysilane or methoxy group-containing phenyl silicone resin) was attached. Therefore, the measured D10, D50, and D90 were considered to be D10, D50, and D90 of the zirconium oxide particles to which the surface-modifying material was attached.

(ii) FT-IR Analysis 10 g Of the obtained third dispersion liquid was dried by vacuum drying for 2 hours. Next, 0.01 to 0.05 g of the obtained metal oxide particles were used, and the transmission spectrum in a wavenumber range of 800 $cm^{-1}$ to 3800 $cm^{-1}$ was measured with a Fourier transform infrared spectrophotometer (manufactured by JASCO Corporation, Model No.: FT/IR-670 Plus). The spectrum values were standardized such that the maximum value of the spectrum in this measurement range became 100 and the minimum value became 0, and the value (IA) at 3500 $cm^{-1}$ and the value (IB) at 1100 $cm^{-1}$ were obtained based on the above standardization. As a result, the IA was 55.2, the IB was 24.9, and the IA/IB was 2.2. The results are shown in Table 1.

(3. Production of Composition)

5.0 g Of the dispersion liquid according to Example 1 and 3.5 g of methyl phenyl silicone (manufactured by Shin-Etsu Chemical Co., Ltd., KER-2500-B) were mixed.

Next, toluene was removed from this liquid mixture with an evaporator, thereby obtaining a composition according to Example 1.

The appearance of the obtained composition according to Example 1 was visually observed and thereby found out to be transparent. As a result, it was possible to confirm that, in the composition, agglomeration of the zirconium oxide particles was suppressed and the zirconium oxide particles were relatively uniformly dispersed.

(Evaluation of Stability of Composition)

The viscosity of the obtained composition was measured using a rheometer (RHEOSTRESS RS-6000, manufactured by HAAKE) under conditions of 25° C. and a shear rate of 1 (1/s).

As a result, the viscosity immediately after the production was 10 Pa·s.

This composition was stored at room temperature (25° C.), and the viscosity was measured after 1 month. As a result, the viscosity of the composition was 50 Pa·s, which showed that the viscosity increased but was low enough to withstand practical use. From this fact, it was possible to confirm that, in the composition, the zirconium oxide particles remained stably dispersed for a long period of time.

(4. Production of LED Package and Evaluation of Brightness)

14 Parts by mass of a methyl phenyl silicone resin ("KER-2500-A/B" manufactured by Shin-Etsu Chemical Co., Ltd. was added to 1 part by mass of the obtained composition and adjusted and mixed such that the surface-modified zirconium oxide particles became 2% by mass in the composition. A composition obtained by mixing 0.38 parts by mass of the particles of a fluorescent body (yttrium aluminum garnet:YAG) with 1 part by mass of this composition (total amount of surface-modified zirconium oxide particles and resin:particles of fluorescent body=100:38) was loaded into an LED lead frame in a thickness of 300 μm.

After that, the composition was held at room temperature for 3 hours. Next, the composition was slowly heated and cured to form a sealing member, thereby producing a white LED package.

The brightness of the obtained white LED package was measured by applying a voltage of 3 V and an electric current of 150 mA to the LED package with a total luminous flux measurement system (manufactured by Otsuka Electronics Co., Ltd.) and measuring the intensity of light. As a result, the brightness of this white LED package was 73.2 lm.

Example 2

(1. Production of Dispersion Liquid)
(i to v) First to Fifth Steps

A dispersion liquid (third dispersion liquid) according to Example 2 was obtained in the same manner as in Example 1 except that, instead of the zirconium oxide particles having an average primary particle diameter of 12 nm, zirconium oxide particles having an average primary particle diameter of 90 nm (manufactured by Sumitomo Osaka Cement Co., Ltd.) were used. The content of the zirconium oxide particles in the liquid mixture obtained in the second step was 30% by mass, the content of methyltrimethoxysilane was 63.5% by mass, and the total content of the zirconium oxide particles and methyltrimethoxysilane was 93.5% by mass.

As a result of measuring the solid content of the first dispersion liquid (residual component after being heated at 100° C. for 1 hour), the amount of the solid content was 70% by mass.

(Particle size distribution of first dispersion liquid) D10, D50, and D90 of the inorganic particles in the first dispersion liquid were measured in the same manner as in Example 1. As a result, D10 was 54 nm, D50 was 120 nm, and D90 was 223 nm. D90/D50 was 1.86.

(2. Evaluation of Dispersion Liquid)
(i) Particle Size Distribution

In addition, as a result of evaluating the particle size distribution of the zirconium oxide particles in the dispersion liquid (third dispersion liquid) according to Example 2 in the same manner as in Example 1, D10 was 95 nm, D50 was 184 nm, and D90 was 284 nm.

(ii) FT-IR Analysis

Furthermore, as a result of carrying out FT-IR analysis in the same manner as in Example 1 on the dispersion liquid according to Example 2, the IA was 51.6, the IB was 24.6, and the IA/IB was 2.1.

(3. Production of Composition)

The obtained third dispersion liquid according to Example 2 was mixed with methyl phenyl silicone in the same manner as in Example 1 to obtain a composition according to Example 2. As a result of visually observing the appearance of the obtained composition, the composition was transparent.

(Evaluation of Stability of Composition)

The viscosity of the composition was measured using a rheometer (RHEOSTRESS RS-6000, manufactured by HAAKE) under conditions of 25° C. and a shear rate of 1 (1/s).

As a result, the viscosity immediately after the production was 10 Pa·s.

This composition was stored at room temperature (25° C.), and the viscosity was measured after 1 month. As a result, the viscosity of the composition was 40 Pa·s, which showed that the viscosity increased but was low enough to withstand practical use.

Comparative Example 1

(1. Production of dispersion liquid) A dispersion liquid (solid content: 30% by mass, third dispersion liquid) according to Comparative Example 1 was obtained in the same manner as in Example 1 except that, in the second step, instead of using and mixing 70 parts by mass of the hydrolysis liquid with the zirconium oxide particles, 20 parts by mass of the hydrolysis liquid and 50 parts by mass of isopropyl alcohol were used.

As a result of measuring the solid content of the first dispersion liquid (residual component after being heated at 100° C. for 1 hour), the amount of the solid content was 38% by mass.

(Particle Size Distribution of First Dispersion Liquid)

D10, D50, and D90 of the first dispersion liquid were measured in the same manner as in Example 1. As a result, the first dispersion liquid had D10 of 13 nm, D50 of 62 nm, and D90 of 95 nm.

(2. Evaluation of Dispersion Liquid)
(i) Particle Size Distribution

The dispersion liquid according to Comparative Example 1 had D10 of 52 nm, D50 of 105 nm, and D90 of 195 nm.
(ii) FT-IR Analysis Furthermore, as a result of carrying out FT-IR analysis in the same manner as in Example 1 on the dispersion liquid according to Comparative Example 1, the IA was 46.6, the IB was 10.8, and the IA/IB was 4.3.

(3. Production of Composition)

The obtained third dispersion liquid according to Comparative Example 1 was mixed with methyl phenyl silicone in the same manner as in Example 1, and toluene was removed, thereby obtaining a composition according to Comparative Example 1. As a result, the composition according to Comparative Example 1 became white turbid, and it was not possible to obtain a composition capable of sealing LEDs.

The production conditions of the dispersion liquids, the dispersion liquids, and the evaluations of the compositions in Examples 1 and 2 and Comparative Example 1 are summarized in Table 1.

Reference Example 1

A white LED package containing no surface-modified zirconium oxide particles was prepared, and the brightness was measured. That is, the white LED package of the reference example was produced in the same manner as in Example 1 except that, in the production of the LED package of Example 1, instead of setting the ratio between the total amount of the surface-modified zirconium oxide particles and the resin and the particles of a fluorescent body to 100:38, the ratio between the total amount of the resin and the particles of a fluorescent body was set to 100:38.

As a result of carrying out measurement on the obtained white package in the same manner as in Example 1, the brightness of this white LED package was 72.5 lm.

As described above, in Examples 1 and 2 in which the zirconium oxide particles were dispersed in a high concentration of a silane compound, even in a case where methyl phenyl silicone and the dispersion liquid were mixed together, the zirconium oxide particles were preferably dispersed, and the occurrence of turbidity or an excessive increase in the viscosity was not observed. In addition, as described in Example 1 and Reference Example 1, it was confirmed that the brightness of the white LED package can be improved.

On the other hand, in Comparative Example 1, when methyl phenyl silicone and the dispersion liquid were mixed together, the composition to be obtained turned into a gel. Therefore, the composition was not appropriate as a composition for sealing light-emitting elements.

Hitherto, the preferred embodiment of the present invention has been described in detail with reference to the accompanying drawings, but the present invention is not limited to such examples. It is evident that a person skilled in the art of the present invention is able to conceive a variety of modification examples or correction examples within the scope of the technical concept described in the claims, and it is needless to say that such examples are understood to be in the technical scope of the present invention.

TABLE 1

| | | | Example 1 | Example 2 | Comparative Example 1 |
|---|---|---|---|---|---|
| Average primary particle diameter of zirconium oxide particles (nm) | | | 12 | 90 | 12 |
| First step | Composition of hydrolysis liquid | Methyltriethoxysilane (% by mass) | 90.78 | 90.78 | 90.78 |
| | | Water (% by mass) | 9.21 | 9.21 | 9.21 |
| | | 1N hydrochloric acid (% by mass) | 0.01 | 0.01 | 0.01 |
| Second and third steps | Composition of liquid mixture | Zirconium oxide particles (% by mass) | 30 | 30 | 30 |
| | | Hydrolysis liquid (% by mass) | 70 | 70 | 20 |
| | | Isopropyl alcohol (% by mass) | — | — | 50 |
| Fourth step | Composition of treatment liquid | First dispersion liquid (parts by mass) | 39.0 | 39.0 | 39.0 |
| | | Methyl phenyl silicone (parts by mass) | 8.6 | 8.6 | 8.6 |
| | | Toluene (parts by mass) | 52.4 | 52.4 | 52.4 |
| Evaluation | Particle size distribution of zirconium oxide particles in dispersion liquid | D10 (nm) | 54 | 95 | 52 |
| | | D50 (nm) | 108 | 184 | 105 |
| | | D90 (nm) | 213 | 285 | 195 |
| | FT-IR analysis of zirconium oxide particles in dispersion liquid | IA (value at 3500 $cm^{-1}$) | 55.2 | 51.6 | 46.6 |
| | | IB (value at 1100 $cm^{-1}$) | 24.9 | 24.6 | 10.8 |
| | | IA/IB | 2.2 | 2.1 | 4.3 |
| | Composition | Appearance | Transparent | Transparent | White turbid |
| | | Initial viscosity (Pa · s) | 10 | 10 | Gelatification |
| | | Viscosity after one-month storage (Pa · s) | 50 | 41 | — |
| | Brightness of LED package (lm) | | 73.2 | — | — |

INDUSTRIAL APPLICABILITY

It is possible to provide a dispersion liquid in which metal oxide particles are contained and dispersion of the metal oxide particles is being controlled when dispersed in a methyl-based silicone resin, a composition containing the same, a sealing member that is formed using the composition, a light-emitting device having this sealing member, an illumination tool and a display device each including this light-emitting device, and a method for producing a dispersion liquid.

REFERENCE SIGNS LIST 1A, 1B, 1C, 1D LIGHT-EMITTING DEVICE
2 SUBSTRATE
21 RECESS PORTION
3 LIGHT-EMITTING ELEMENT
4A, 4B, 4C, 4D SEALING MEMBER
41B, 41C, 41D FIRST LAYER
43B, 43C, 43D SECOND LAYER
45D THIRD LAYER
5 PARTICLE OF FLUORESCENT BODY

The invention claimed is:

1. A dispersion liquid comprising:
metal oxide particles which have been surface-modified with a silane compound and a silicone compound,
wherein, when the dispersion liquid is dried by vacuum drying to separate the metal oxide particles, a transmission spectrum of the separated metal oxide particles is measured in a wavenumber range from 800 cm$^{-1}$ to 3800 cm$^{-1}$ with a Fourier transform infrared spectrophotometer, and spectrum values measured in the range are standardized such that a maximum value of the spectrum values is set to 100 and a minimum value of the spectrum values is set to 0,
Formula (1) below is satisfied:

$$IA/IB \leq 3.5 \qquad (1)$$

(in the formula, "IA" represents a spectrum value at 3500 cm$^{-1}$ and "IB" represents a spectrum value at 1100 cm$^{-1}$), and
wherein the amount of surface-modifying material which consists of the silane compound and the silicone compound is 100% by mass or more and 1000% by mass or less with respect to the amount of the metal oxide particles.

2. The dispersion liquid according to claim 1, wherein the content of the metal oxide particles in the dispersion liquid is 1% by mass or more and 70% by mass or less.

3. The dispersion liquid according to claim 1, wherein the content of the metal oxide particles in the dispersion liquid is 10% by mass or more and 70% by mass or less.

4. The dispersion liquid according to claim 1, wherein the content of the metal oxide particles in the dispersion liquid is 20% by mass or more and 70% by mass or less.

5. The dispersion liquid according to claim 1, wherein the content of the silane compound in the dispersion liquid is 50% by mass or more and 500% by mass or less with respect to 100% by mass of the amount of the metal oxide particles.

6. The dispersion liquid according to claim 1, wherein the content of the silicone compound in the dispersion liquid is 50% by mass or more and 500% by mass or less with respect to 100% by mass of the amount of the metal oxide particles.

7. The dispersion liquid according to claim 1, wherein the dispersion liquid is produced by a method which comprises:
a first step of mixing at least a silane compound and water to obtain a hydrolysis liquid in which the silane compound is hydrolyzed;
a second step of mixing the hydrolysis liquid and metal oxide particles to obtain a liquid mixture;
a third step of dispersing the metal oxide particles in the liquid mixture to obtain a first dispersion liquid; and
a fourth step of treating the metal oxide particles in the first dispersion liquid with a silicone compound to obtain a second dispersion liquid,
wherein a content of the metal oxide particles in the liquid mixture is 10% by mass or more and 49% by mass or less, and a total content of the silane compound and the metal oxide particles in the liquid mixture is 65% by mass or more and 98% by mass or less.

8. A composition which is obtained by mixing the dispersion liquid according to claim 1 and a resin component.

9. A sealing member which is a cured substance of the composition according to claim 8.

10. A light-emitting device comprising:
the sealing member according to claim 9; and
a light-emitting element sealed by the sealing member.

11. An illumination tool or a display device comprising:
the light-emitting device according to claim 10.

12. A method for producing the dispersion liquid according to claim 1, comprising:
a first step of mixing at least a silane compound and water to obtain a hydrolysis liquid in which the silane compound is hydrolyzed;
a second step of mixing the hydrolysis liquid and metal oxide particles to obtain a liquid mixture;
a third step of dispersing the metal oxide particles in the liquid mixture to obtain a first dispersion liquid; and
a fourth step of treating the metal oxide particles in the first dispersion liquid with a silicone compound to obtain a second dispersion liquid,
wherein a content of the metal oxide particles in the liquid mixture is 10% by mass or more and 49% by mass or less, and a total content of the silane compound and the metal oxide particles in the liquid mixture is 65% by mass or more and 98% by mass or less.

13. The method for producing a dispersion liquid according to claim 12,
wherein, in the first step, a catalyst is mixed together with the silane compound and the water.

* * * * *